United States Patent
Sakai et al.

(10) Patent No.: US 10,935,660 B2
(45) Date of Patent: Mar. 2, 2021

(54) CONTROL SYSTEM OF WORK MACHINE, WORK MACHINE, MANAGEMENT SYSTEM OF WORK MACHINE, AND METHOD OF MANAGING WORK MACHINE

(71) Applicant: Komatsu Ltd., Tokyo (JP)

(72) Inventors: Atsushi Sakai, Hiratsuka (JP); Masanori Tojima, Hiratsuka (JP)

(73) Assignee: KOMATSU LTD., Tokyo (JP)

(*) Notice: Subject to any disclaimer, the term of this patent is extended or adjusted under 35 U.S.C. 154(b) by 19 days.

(21) Appl. No.: 15/563,693

(22) PCT Filed: Oct. 30, 2015

(86) PCT No.: PCT/JP2015/080865
§ 371 (c)(1),
(2) Date: Oct. 2, 2017

(87) PCT Pub. No.: WO2017/072980
PCT Pub. Date: May 4, 2017

(65) Prior Publication Data
US 2018/0074201 A1    Mar. 15, 2018

(51) Int. Cl.
*G01S 17/87* (2020.01)
*B60W 50/02* (2012.01)
(Continued)

(52) U.S. Cl.
CPC ............ *G01S 17/87* (2013.01); *B60W 50/02* (2013.01); *G01S 13/865* (2013.01);
(Continued)

(58) Field of Classification Search
CPC .......... G05D 2201/021; G05D 1/0278; G05D 1/0274; G05D 1/0272; G05D 1/024;
(Continued)

(56) References Cited

U.S. PATENT DOCUMENTS 8,396,659 B2    3/2013 Ando et al.
9,671,235 B2 *  6/2017 Bartels ................... G01C 21/34
(Continued)

FOREIGN PATENT DOCUMENTS

AU    2013408997 B2    4/2018
CN    101197077 A      6/2008
(Continued)

OTHER PUBLICATIONS

International Search Report dated Jan. 12, 2016, issued for PCT/JP2015/080865.
(Continued)

*Primary Examiner* — Hunter B Lonsberry
*Assistant Examiner* — Mathew Franklin Gordon
(74) *Attorney, Agent, or Firm* — Locke Lord LLP

(57) ABSTRACT

A control system is provided with a position detection device which detects a position of a work machine, a contactless sensor which detects an object around the work machine in a contactless manner, a position calculation unit which calculates a position of the work machine on the basis of at least map data indicating a position of the object and detection data of the contactless sensor, and a diagnosis unit which compares the position of the work machine derived from detection data of the position detection device and the position of the work machine calculated by the position calculation unit and diagnoses that there is an abnormality in either the detection data of the position detection device or a calculation result of the position calculation unit.

20 Claims, 14 Drawing Sheets

(51) Int. Cl.

| | |
|---|---|
| *G01S 19/48* | (2010.01) |
| *G05B 9/02* | (2006.01) |
| *G05D 1/00* | (2006.01) |
| *G01S 17/06* | (2006.01) |
| *G01S 17/42* | (2006.01) |
| *G05D 1/02* | (2020.01) |
| *G01S 13/931* | (2020.01) |
| *G01S 13/86* | (2006.01) |
| *G01S 17/931* | (2020.01) |
| *B60W 10/06* | (2006.01) |
| *B60W 10/18* | (2012.01) |

(52) U.S. Cl.
 CPC ............ *G01S 13/931* (2013.01); *G01S 17/06* (2013.01); *G01S 17/42* (2013.01); *G01S 17/931* (2020.01); *G01S 19/48* (2013.01); *G05B 9/02* (2013.01); *G05D 1/0088* (2013.01); *G05D 1/024* (2013.01); *G05D 1/0272* (2013.01); *G05D 1/0274* (2013.01); *G05D 1/0278* (2013.01); *B60W 10/06* (2013.01); *B60W 10/18* (2013.01); *G05B 2219/2616* (2013.01); *G05D 2201/021* (2013.01)

(58) Field of Classification Search
 CPC .......... G05D 1/0088; G05B 2219/2616; G05B 9/02; B60W 10/18; B60W 10/06; B60W 50/02; G01S 17/87; G01S 19/48; G01S 17/936; G01S 17/42; G01S 17/06; G01S 13/931; G01S 13/865
 See application file for complete search history.

(56) References Cited

U.S. PATENT DOCUMENTS

| | | | |
|---|---|---|---|
| 2002/0099481 | A1 | 7/2002 | Mori |
| 2010/0103040 | A1* | 4/2010 | Broadbent .............. G01S 19/48 |
| | | | 342/357.28 |
| 2010/0217522 | A1 | 8/2010 | Ando et al. |
| 2012/0299702 | A1 | 11/2012 | Edara et al. |
| 2012/0310516 | A1 | 12/2012 | Zeng |
| 2014/0236477 | A1 | 8/2014 | Chen et al. |
| 2017/0090036 | A1* | 3/2017 | Zalewski .............. G01S 19/215 |
| 2017/0109947 | A1* | 4/2017 | Prokhorov ........... G07C 5/0816 |
| 2017/0139414 | A1* | 5/2017 | Muto .................... B60W 50/02 |

FOREIGN PATENT DOCUMENTS

| | | |
|---|---|---|
| CN | 101545788 A | 9/2009 |
| CN | 102724482 A | 10/2012 |
| JP | H05-288559 A | 11/1993 |
| JP | H09-44244 A | 2/1997 |
| JP | 10-300493 A | 11/1998 |
| JP | 11-325930 A | 11/1999 |
| JP | 2000-172337 A | 6/2000 |
| JP | 2002-215236 A | 7/2002 |
| JP | 2004-264182 A | 9/2004 |
| JP | 2006209567 A | 8/2006 |
| JP | 2010-096584 A | 4/2010 |
| JP | 2010-197278 A | 9/2010 |

OTHER PUBLICATIONS

Office Action dated Jun. 18, 2018, issued for the Australian patent application No. 2015413042.

* cited by examiner

CONTROL SYSTEM OF WORK MACHINE, WORK MACHINE, MANAGEMENT SYSTEM OF WORK MACHINE, AND METHOD OF MANAGING WORK MACHINE

FIELD

The present invention relates to a control system of a work machine, a work machine, a management system of a work machine, and a method of managing a work machine.

BACKGROUND

When a mining machine travels at a mining site of a mine, there is a case in which position data of the mining machine is obtained using a global navigation satellite system (GNSS) such as a global positioning system (GPS). Map matching technology in the GPS is disclosed in Patent Literature 1.

CITATION LIST

Patent Literature

Patent Literature 1: JP 11-325930 A

SUMMARY

Technical Problem

As a diagnostic method of accuracy of position data obtained by the GNSS, for example, a diagnostic method on the basis of a diagnostic method using the GNSS itself to be described later (method of determining by arrangement of positioning satellites, the number of positioning satellites which receive data and the like) is known. However, with these diagnostic methods, accurate diagnosis might be difficult due to influence of multipath of the GNSS, tire slipping of a mining machine and the like. Meanwhile, the multipath of the GNSS is intended to mean a phenomenon that an error occurs in obtained position data when a radio wave transmitted from a GNSS satellite is reflected by the ground, a building and the like, reflected or refracted by the ionosphere, and a GNSS receiver receives the radio waves from a plurality of transmission paths.

An object of an aspect of the present invention is to provide a control system of a work machine capable of accurately diagnosing the accuracy of the position data obtained by the GNSS when the position data of the mining machine is obtained using the GNSS and appropriately controlling travel of the mining machine, a work machine, a management system of a work machine, and a method of managing a work machine.

Solution to Problem

According to a first aspect of the present invention, a control system of a work machine comprises: a position detection device which detects a position of a work machine; a contactless sensor which detects an object around the work machine in a contactless manner; map data indicating a position of the object; a position calculation unit which calculates a position of the work machine on the basis of at least the map data indicating the position of the object and detection data of the contactless sensor; and a diagnosis unit which compares the position of the work machine derived from detection data of the position detection device and the position of the work machine calculated by the position calculation unit and diagnoses that there is an abnormality in either the detection data of the position detection device or a calculation result of the position calculation unit.

According to a second aspect of the present invention, a control system comprises: a position detection device which detects orientation of a work machine; a contactless sensor which detects an object around the work machine in a contactless manner; map data indicating a position of the object; a position calculation unit which calculates orientation of the work machine on the basis of at least the map data indicating the position of the object and detection data of the contactless sensor; and a diagnosis unit which compares the orientation of the work machine derived from detection data of the position detection device and the orientation of the work machine calculated by the position calculation unit and diagnoses that there is an abnormality in either the detection data of the position detection device or a calculation result of the position calculation unit.

According to a third aspect of the present invention, a work machine comprises: the control system according to the first or second aspect.

According to a fourth aspect of the present invention, a management system of a work machine comprises: a management device which outputs course data defining the travel route to the work machine according to the third aspect.

According to a fifth aspect of the present invention, a method of managing a work machine comprises: detecting a position of a work machine by a position detection device; detecting an object around the work machine in a contactless manner by a contactless sensor; calculating a position of the work machine on the basis of at least map data indicating a position of the object and detection data of the contactless sensor; and comparing the position of the work machine derived from detection data of the position detection device with the calculated position of the work machine, and diagnosing that there is an abnormality in either the detection data of the position detection device or the calculation result of the position of the work machine.

Advantageous Effects of Invention

According to the aspect of the present invention, when position data of a work machine is obtained using a GNSS, a control system capable of accurately diagnosing accuracy of the position data obtained by the GNSS and appropriately controlling travel of the work machine, a work machine, a management system of a work machine, and a method of managing a work machine are provided.

DESCRIPTION OF EMBODIMENTS

An embodiment according to the present invention is hereinafter described with reference to the drawings; however, the present invention is not limited to this.

First Embodiment

<Outline of Management System of Mining Machine>

Figure 1:
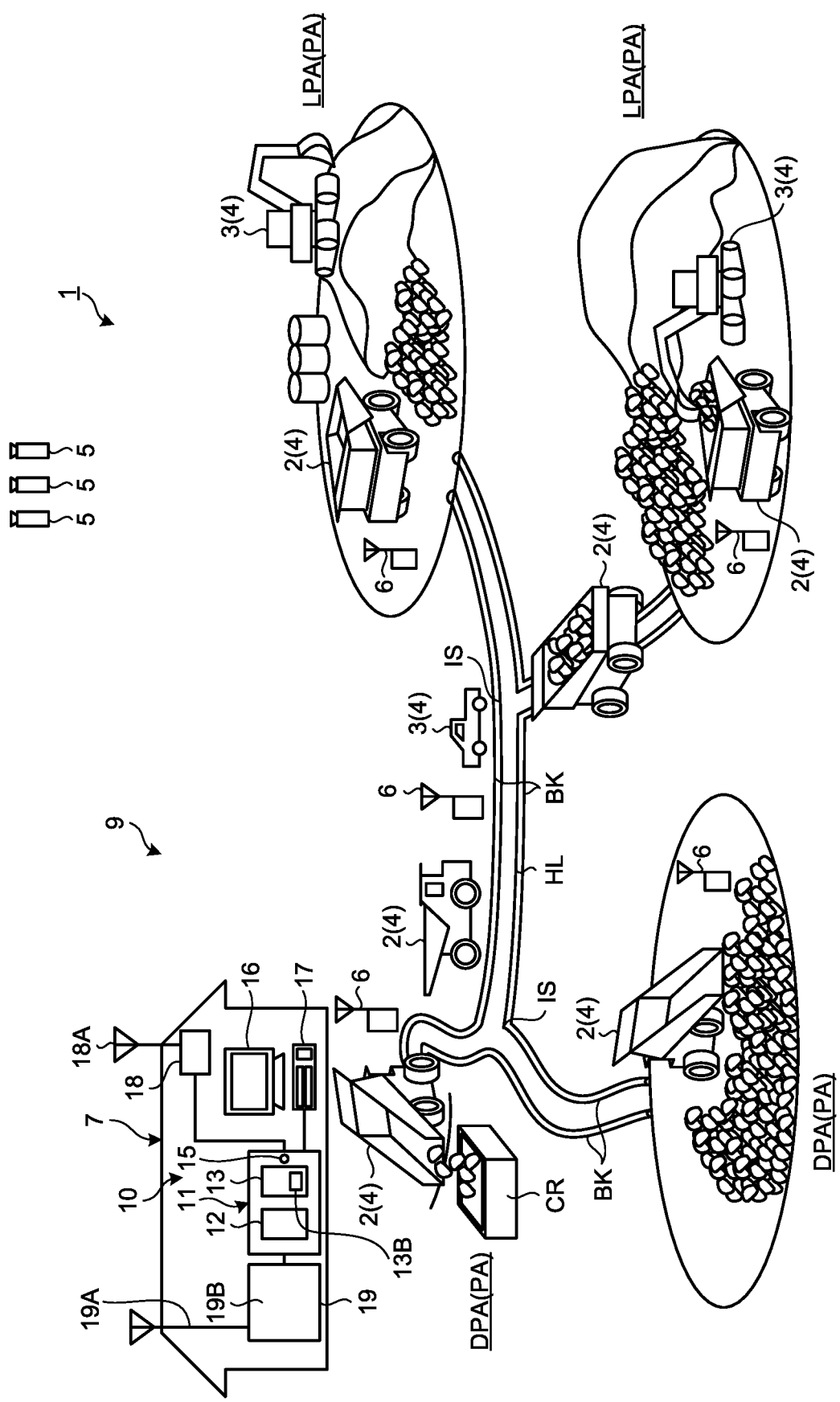
FIG. 1 is a view illustrating an example of a management system of a mining machine according to the first embodiment.

FIG. 1 is a view illustrating an example of a management system 1 of a mining machine 4 according to a first embodiment. The management system 1 manages the mining machine 4. Management of the mining machine 4 includes at least one of operation management of the mining machine 4, evaluation of productivity of the mining machine 4, evaluation of operational technology of an operator of the mining machine 4, maintenance of the mining machine 4, and abnormality diagnosis of the mining machine 4.

The mining machine 4 is a collective term of machinery used in various operations in a mine. The mining machine 4 includes at least one of a boring machine, an excavating machine, a loading machine, a transporting machine, a crusher, and a vehicle driven by a worker. The excavating machine is the mining machine for excavating the mine. The loading machine is the mining machine for loading the transporting machine. The loading machine includes at least one of a hydraulic excavator, an electric excavator, and a wheel loader. The transporting machine is the mining machine including a moving body such as a dump truck movable in the mine for transporting the load. The load includes at least one of earth and sand and minerals generated by excavating. The crusher crushes discharged earth input from the transporting machine.

In the first embodiment, an example in which a dump truck 2 being the transporting machine capable of traveling the mine is managed by the management system 1 is described. As illustrated in FIG. 1, the dump truck 2 travels at least a part of a mine work area PA and a conveyance path HL leading to the work area PA. The work area PA includes at least one of a loading area LPA and an earth discharging area DPA. The conveyance path HL includes an intersection IS. The dump truck 2 travels a travel route set on the conveyance path HL and the work area PA. An object is provided beside the conveyance path HL. In the first embodiment, the object provided beside the conveyance path HL is assumed to be a bank BK. Meanwhile, the object provided beside the conveyance path HL may be a side wall or an artificially manufactured structure. For example, the object may include metal or concrete.

The dump truck 2 is the moving body movable in the mine. The travel route is set in at least a part of the loading area LPA, the earth discharging area DPA, and the conveyance path HL.

The loading area LPA is an area in which a loading operation of loading the dump truck 2 is performed. The earth discharging area DPA is an area in which a discharging operation of discharging the load from the dump truck 2 is performed. A crusher CR may also be provided in at least a part of the discharging area DPA.

In the first embodiment, the dump truck 2 is a so-called unmanned dump truck which autonomously travels the travel route on the basis of a command signal from a management device 10. The autonomous travel of the dump truck 2 means travel based on the command signal from the management device 10 without depending on operation of the worker. Meanwhile, the dump truck 2 may also travel by the operation of the worker.

In FIG. 1, the management system 1 is provided with the management device 10 arranged in a control facility 7 installed in the mine, a communication system 9, the dump truck 2, and a mining machine 3 being the mining machine 4 other than the dump truck 2. The management device 10 is installed in the control facility 7 in the mine and basically does not move, but the management device 10 may also be movable. The communication system 9 wirelessly communicates data or the command signal among the management device 10, the dump truck 2, and other mining machine 3. The communication system 9 enables bidirectional wireless communication between the management device 10 and the dump truck 2, between the management device 10 and other mining machine 3, and between the dump truck 2 and other mining machine 3. In the first embodiment, the communication system 9 includes a plurality of relays 6 which relays the data or command signal (radio wave and the like).

In the first embodiment, a position of the dump truck 2 and a position of the other mining machine 3 are detected using a real time kinematic-global navigation satellite system (RTK-GNSS). The GNSS refers to a global navigation satellite system. There is a GPS as an example of the global navigation satellite system. The RTK-GNSS includes a plurality of positioning satellites 5. The RTK-GNSS detects a position defined by latitude, longitude, and height coordinate data. The position detected by the RTK-GNSS is an absolute position defined in a global coordinate system.

With the RTK-GNSS, the position of the dump truck 2 and the position of other mining machine 3 in the mine are detected.

In the following description, the position detected by the RTK-GNSS is referred to as a GPS position as appropriate. The GPS position is the absolute position, and is latitude, longitude, and height coordinate data. In the RTK-GNSS, due to influence of at least one of the arrangement of the positioning satellites 5, the number of the positioning satellites 5 which receive the data, the ionosphere, the troposphere, and a land form around an antenna which receives the data from the positioning satellite 5, a positioning status (accuracy of position) changes. The positioning status includes a Fix solution (accuracy of approximately ±1 to 2 centimeters), a Float solution (accuracy of approximately ±10 centimeters to several meters), a Single solution (accuracy of approximately ±several meters), and non-positioning (positioning calculation cannot be performed).

Meanwhile, in this specification, the "absolute position" does not indicate a true position of the dump truck 2 itself but indicates that this is a high-accuracy estimated position with respect to the true position of the dump truck 2.

The management system 1 manages the position and orientation of the dump truck 2 and the position and orientation of other mining machine 3 in the mine in an XY coordinate system defined by an X-axis direction in a horizontal plane and a Y-axis direction in the horizontal plane orthogonal to the X-axis direction. The orientation of the dump truck 2 is a travel direction of the traveling dump truck 2.

<Management Device>

Next, the management device 10 arranged in the control facility 7 is described. The management device 10 transmits the data and command signal to the dump truck 2 and receives the data from the dump truck 2. As illustrated in FIG. 1, the management device 10 is provided with a computer 11, a display device 16, an input device 17, a wireless communication device 18, and a GPS base station 19.

The computer 11 is provided with a processing device 12, a storage device 13, and an input/output unit (input/output interface) 15. The display device 16, the input device 17, the wireless communication device 18, and the GPS base station 19 are connected to the computer 11 through the input/output unit 15.

The processing device 12 executes various processes regarding management of the dump truck 2 and various processes regarding management of other mining machine 3. The processing device 12 obtains position data of the dump truck 2 and position data of other mining machine 3 through the communication system 9 in order to perform the various processes.

Figure 2:
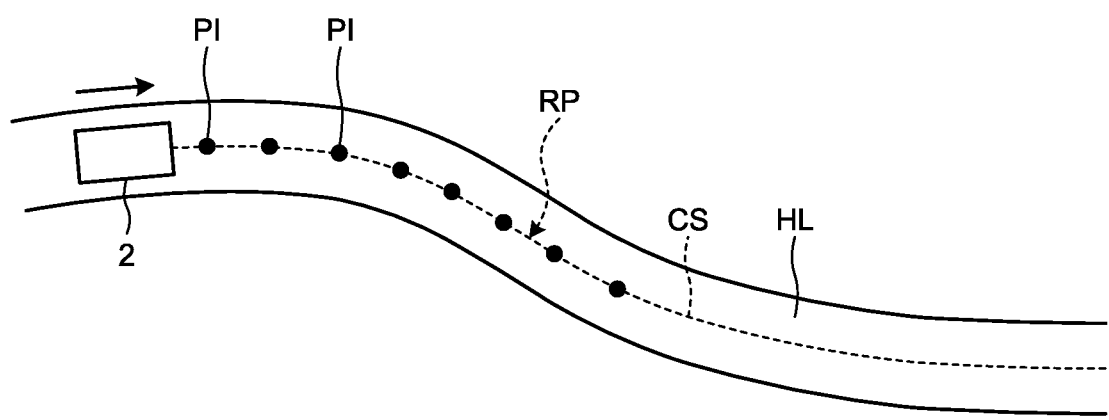
FIG. 2 is a schematic diagram for illustrating a travel route of a dump truck according to the first embodiment.

FIG. 2 is a schematic diagram illustrating the dump truck 2 which travels the conveyance path HL. The processing device 12 sets the travel route RP which the dump truck 2 travels. The travel route RP is defined by course data CS. The course data CS is an aggregate of a plurality of point PIs absolute positions (latitude, longitude, and height coordinate data) of which are defined. That is, a trajectory passing through a plurality of points PI is the travel route RP. The processing device 12 serves as a course data creation unit which generates the course data CS which defines the travel route RP of the dump truck 2. The processing device 12 creates the course data CS and sets the travel route RP.

The storage device 13 connected to the processing device 12 stores various data regarding the management of the dump truck 2 and various data regarding the management of other mining machine 3. The storage device 13 stores the position data of the dump truck 2 and the position data of other mining machine 3.

The display device 16 is capable of displaying a map including the conveyance path HL and the like in the mine, the position data of the dump truck 2, and the position data of other mining machine 3. The input device 17 serves as an operation unit capable of inputting an operation signal to the processing device 12.

The wireless communication device 18 including an antenna 18A is arranged in the control facility 7 and is connected to the processing device 12 through the input/output unit 15. The wireless communication device 18 is a part of the communication system 9. The wireless communication device 18 may receive the data transmitted from at least one of the dump truck 2 and other mining machine 3. The data received by the wireless communication device 18 is output to the processing device 12 to be stored in the storage device 13. The wireless communication device 18 may transmit the data to at least one of the dump truck 2 and other mining machine 3.

The GPS base station 19 provided with an antenna 19A which receives the data from a plurality of positioning satellites 5 and a transmission/reception device 19B connected to the antenna 19A is arranged in the control facility 7. The transmission/reception device 19B is provided with a receiver which receives the data from the positioning satellite 5 through the antenna 19A and a transmitter which transmits the data to the dump truck 2 through the wireless communication device 18. The transmission/reception device 19B calculates the GPS position of the GPS base station 19 on the basis of the data received through the antenna 19A, generates correction observation data for correcting the GPS position of the dump truck 2, and transmits the correction observation data to the dump truck 2 and other mining machine 3 through the wireless communication device 18.

The computer 11 is provided with the input/output unit 15 for communication, the processing device 12, and the storage device which stores various databases 13B.

<Other Mining Machine>

Next, other mining machine 3 is described. Other mining machine 3 is the mining machine other than the dump truck 2 operated by the operation of the worker. Other mining machine 3 is provided with a processing device including a CPU which executes various processes regarding work contents, a GPS receiver which detects the GPS position, and a wireless communication device which transmits and receives the data to and from the wireless communication device 18 of the control facility 7. Other mining machine 3 transmits the GPS position of the same to the wireless communication device 18 of the control facility 7 every predetermined time.

<Dump Truck>

Figure 3:
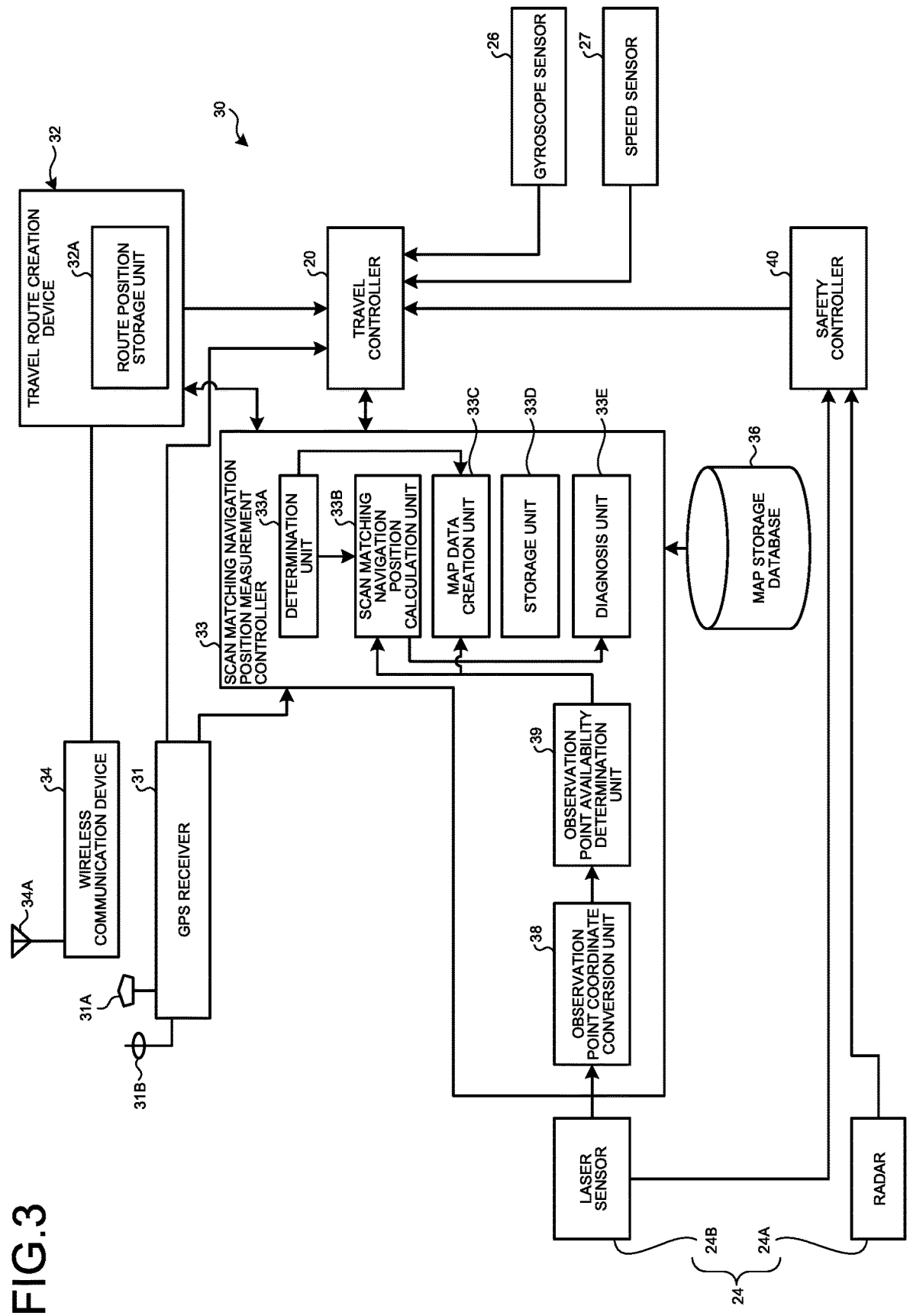
FIG. 3 is a control block diagram of the dump truck according to the first embodiment.
Figure 4:
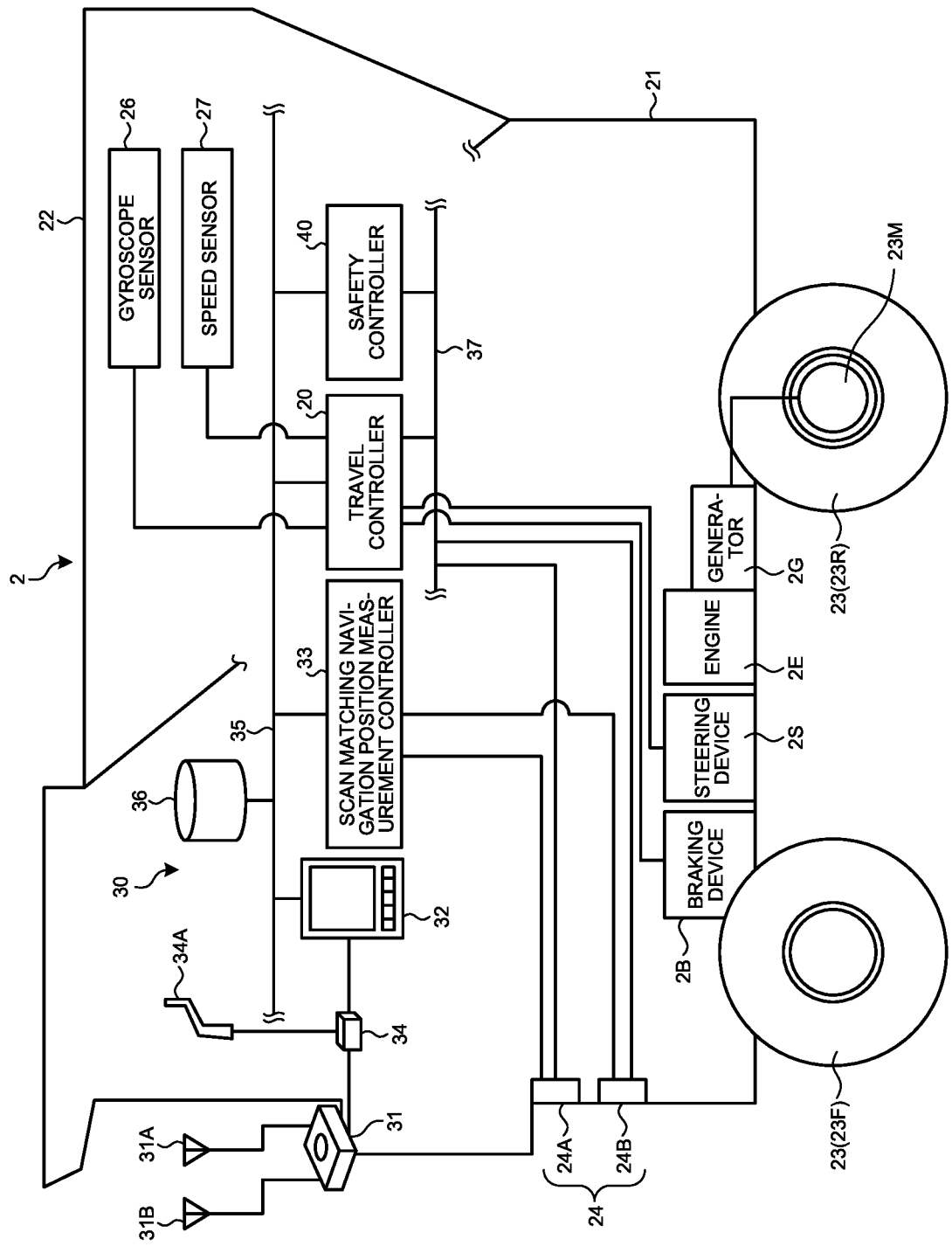
FIG. 4 is a hardware configuration diagram of the dump truck according to the first embodiment.
Figure 5:
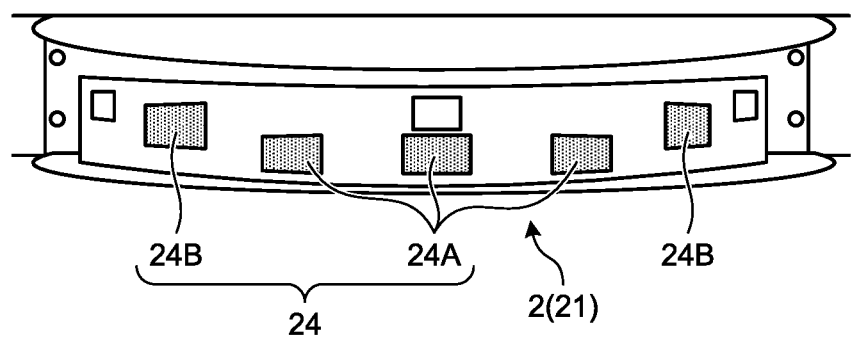
FIG. 5 is a front view of an obstacle sensor of the dump truck according to the first embodiment.
Figure 6:
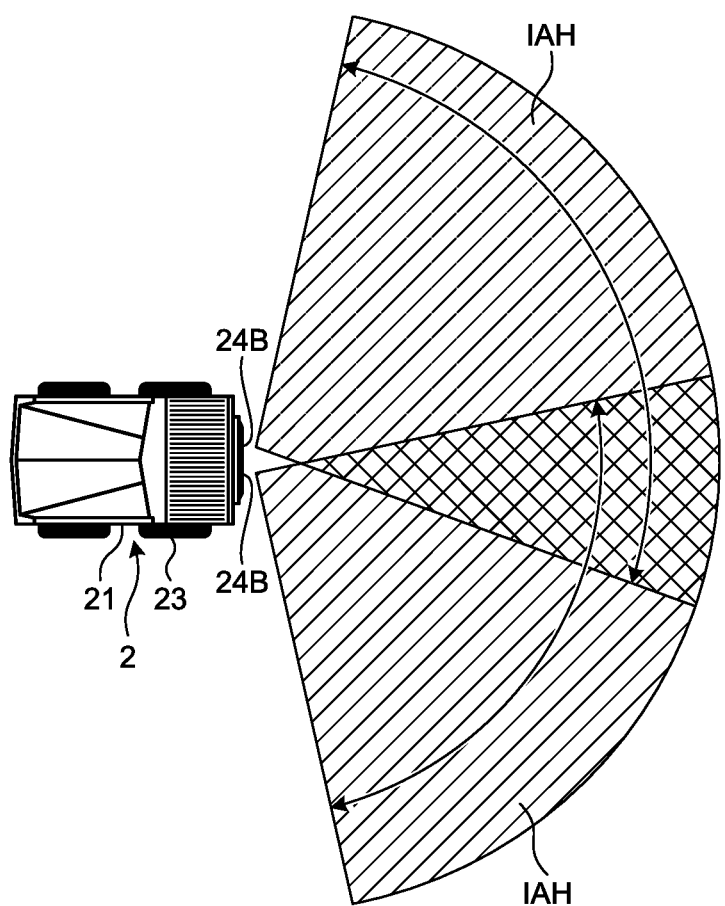
FIG. 6 is a plan view illustrating a detection area of a contactless sensor.
Figure 7:
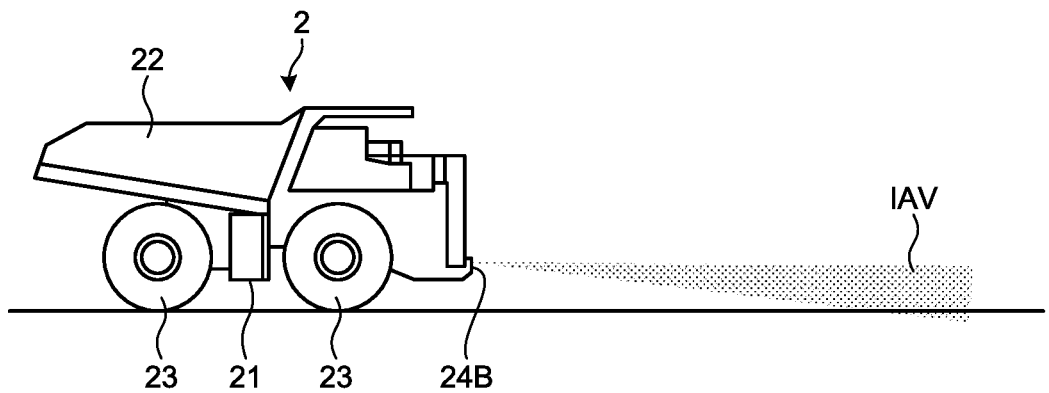
FIG. 7 is a side view illustrating the detection area of the contactless sensor.

Next, the dump truck 2 is described. FIG. 3 is a control block diagram of the dump truck 2 according to the first embodiment. FIG. 4 is a hardware configuration diagram of the dump truck 2 according to the first embodiment. FIG. 5 is a front view of a contactless sensor 24 of the dump truck 2 according to the first embodiment. FIG. 6 is a plan view illustrating a detection area of a laser sensor 24B of the contactless sensor 24. FIG. 7 is a side view illustrating the detection area of the laser sensor 24B of the contactless sensor 24.

As illustrated in FIG. 4, the dump truck 2 is provided with a vehicle body 21, a vessel 22, a wheel 23, the contactless sensor 24, and a control system 30. An engine 2E such as a diesel engine, a generator 2G operated by the engine 2E, and a motor 23M operated with electric power generated by the generator are provided in the vehicle body 21. The wheel 23 includes a front wheel 23F and a rear wheel 23R. The rear wheel 23R is driven by the motor 23M. Meanwhile, the power of the engine 2E may be transmitted to the rear wheel 23R through a transmission including a torque converter. A steering device 2S for steering the front wheel 23F is provided on the vehicle body 21. The vessel 22 is loaded by the loading machine. In the discharging operation, the vessel 22 is lifted, and the load is discharged from the vessel 22.

As illustrated in FIG. 4, the contactless sensor 24 is arranged in a front lower portion of the vehicle body 21. The contactless sensor 24 detects an object around the dump truck 2 in a contactless manner. The object around the dump truck 2 includes the object (bank BK, side wall and the like) present beside the travel route RP. The contactless sensor 24 serves as an obstacle sensor which detects an obstacle in front of the dump truck 2 in a contactless manner.

The contactless sensor 24 may detect a relative position of the object with respect to the contactless sensor 24 (dump truck 2). The contactless sensor 24 includes a radar 24A and the laser sensor 24B. Resolution of the laser sensor 24B is higher than the resolution of the radar 24A.

The radar 24A emits a radio wave, irradiates the object with the radio wave, and receives the radio wave reflected by the object. According to this, the radar 24A may detect a direction and a distance of the object from the radar 24A. In the first embodiment, three radars 24A are provided at intervals in a right-to-left direction of the vehicle body 21.

The laser sensor 24B emits a laser beam, irradiates the object with the laser beam, and receives the laser beam reflected by the object. According to this, the laser sensor 24B may detect the direction and the distance of the object from the laser sensor 24B. In the first embodiment, two laser sensors 24B are provided at intervals in the right-to-left direction of the vehicle body 21.

Each of the two laser sensors 24B emits a plurality of laser beams having different orientations in an up-and-down direction (vertical direction), and swings each of a plurality of laser beams in the right-to-left direction such that an irradiation area IAH of the laser beam in the right-to-left direction (horizontal direction) of the laser beams has a predetermined angle. As illustrated in FIG. 6, the two laser sensors 24B swing the laser beams so that the irradiation areas IAH of the laser beams emitted from the two laser sensors 24B overlaps at the center in the right-to-left direction. As illustrated in FIG. 7, the laser sensor 24B irradiates an irradiation area IAV inclined downward from the vehicle body 21 with the laser beam. The irradiation areas IAH and IAV of the laser beam are the detection areas of the object and the like by the laser sensor 24B. During the travel of the dump truck 2, an installation position of the laser sensor 24B and the irradiation area of the laser beam are determined such that the object (bank BK) beside the travel route RP is arranged in the detection area of the laser sensor 24B. Meanwhile, although the irradiation area of the radar 24A is also defined, the irradiation area is not illustrated in FIGS. 6 and 7.

The contactless sensor 24 including the radar 24A and the laser sensor 24B is connected to a scan matching navigation position measurement controller 33 through a second communication line 37 of the control system 30. The scan matching navigation is an abbreviation for Scan Matching Navigation.

<Control System>

Figure 8:
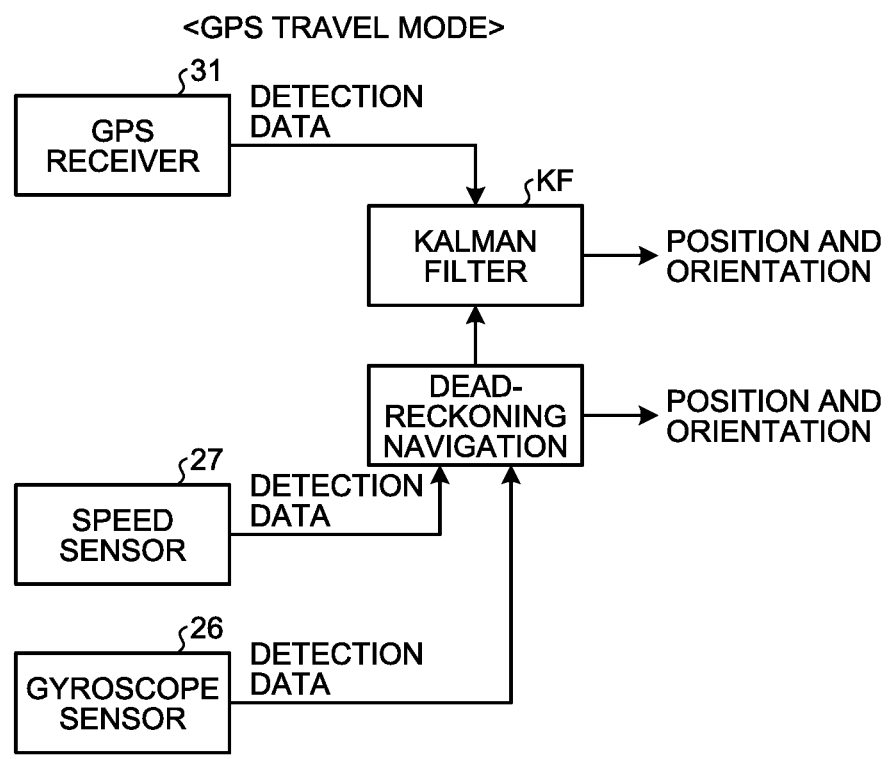
FIG. 8 is a view illustrating a method by which a travel controller detects a position and orientation in a GPS travel mode of a control system according to the first embodiment.
Figure 9:
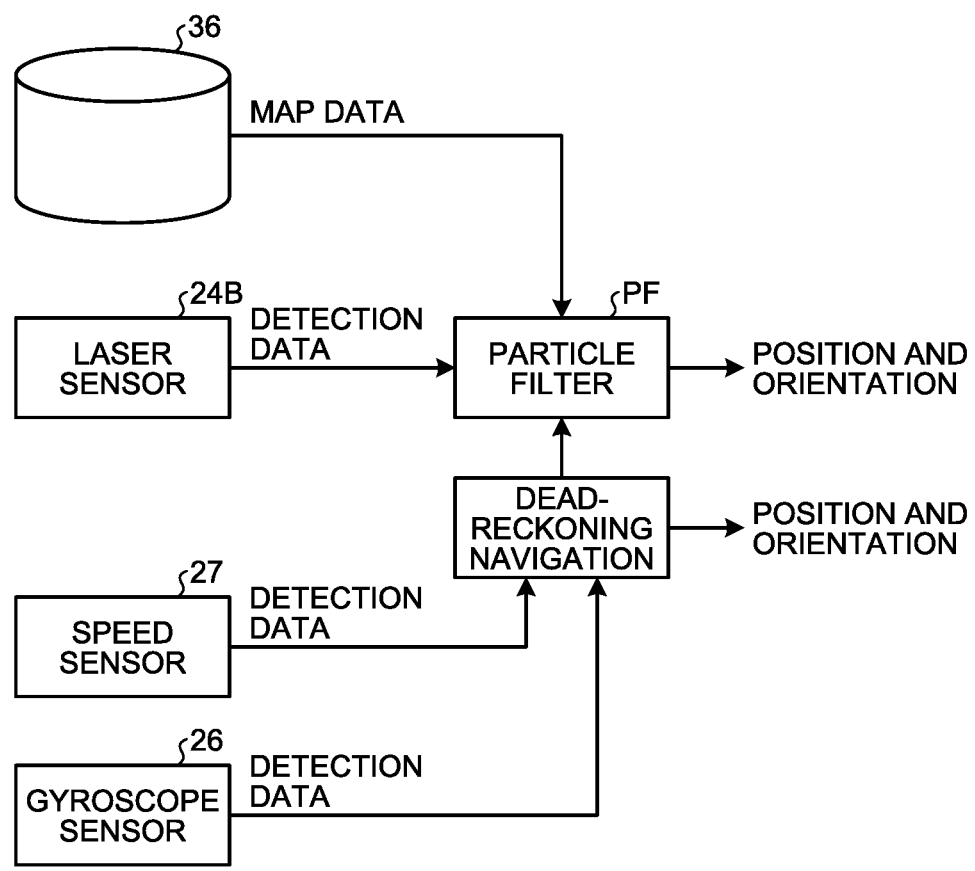
FIG. 9 is a view illustrating a method by which a scan matching navigation position calculation unit of a position measurement controller calculates the position and orientation in a scan matching navigation travel mode of the control system according to the first embodiment.
Figure 10:
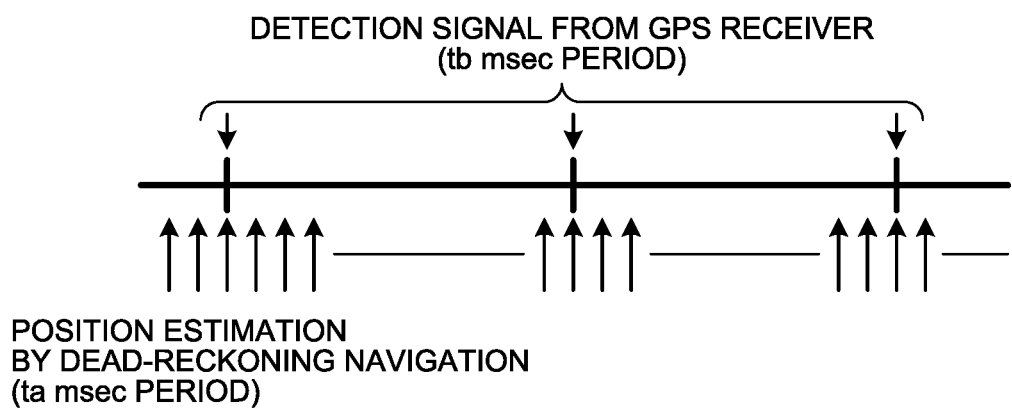
FIG. 10 is a view for illustrating a timing at which a detection signal from a GPS receiver is input.
Figure 11:
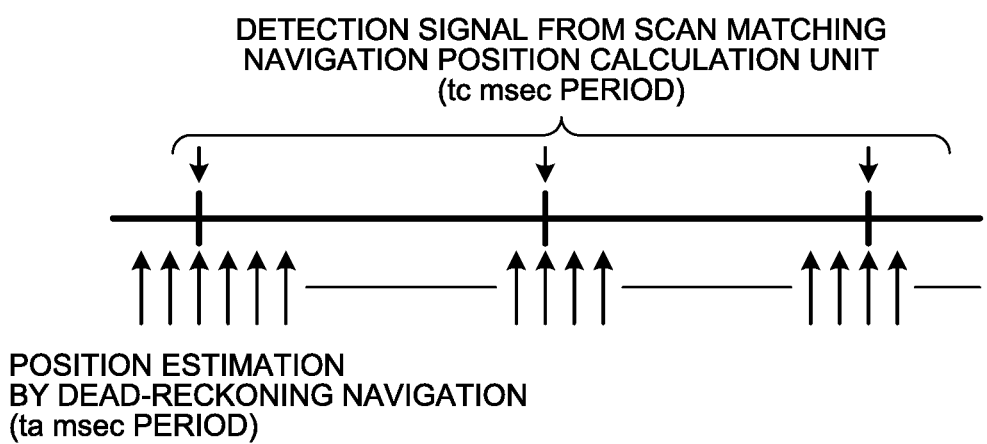
FIG. 11 is a view for illustrating a timing at which position data from the scan matching navigation position calculation unit is input.
Figure 12:
FIG. 12 is a view illustrating a part of map data stored in a map storage database of the control system according to the first embodiment.
Figure 12:
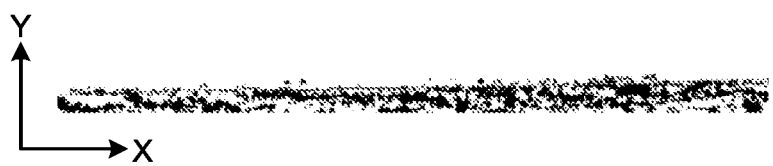
Figure 13:
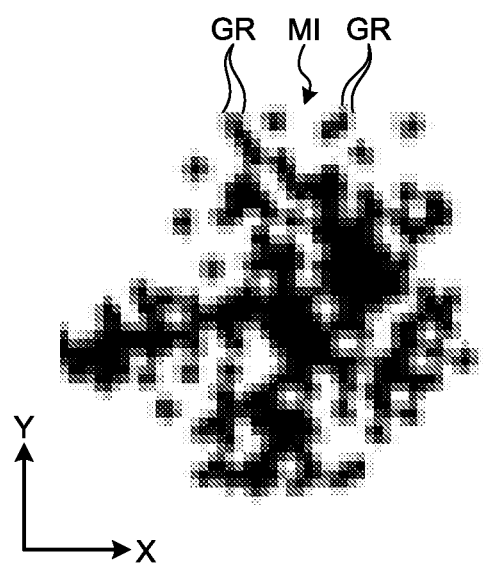
FIG. 13 is an enlarged view of a XIV portion in FIG. 12.

The control system 30 is next described. FIG. 8 is a view illustrating a method by which a travel controller 20 of the control system 30 detects the position and orientation in a GPS travel mode according to the first embodiment. FIG. 9 is a view illustrating a method by which a scan matching navigation position calculation unit 33B of the scan matching navigation position measurement controller 33 of the control system 30 calculates the position and orientation in a scan matching navigation travel mode according to the first embodiment. FIG. 10 is a view for illustrating a timing at which a detection signal from a GPS receiver 31 is input. FIG. 11 is a view for illustrating a timing at which the position data from the scan matching navigation position calculation unit 33B is input. FIG. 12 is a view illustrating a part of map data MI stored in a map storage database 36 of the control system 30 according to the first embodiment. FIG. 13 is an enlarged view of a XIV portion in FIG. 12.

The control system 30 is installed in the dump truck 2. The control system 30 allows the dump truck 2 to autonomously travel according to the travel route RP. As illustrated in FIGS. 3 and 4, the control system 30 is provided with a gyroscope sensor 26, a speed sensor 27, the GPS receiver 31, a travel route creation device 32, the scan matching navigation position measurement controller 33, a travel controller 20, the contactless sensor 24, a wireless communication device 34, and the map storage database 36. Also, the control system 30 is provided with a first communication line 35, the second communication line 37, and a safety controller 40.

As illustrated in FIG. 4, the travel controller 20, the travel route creation device 32, the scan matching navigation position measurement controller 33, the map storage database 36, and the safety controller 40 are connected to the first communication line 35 to perform data communication through the first communication line 35. The travel controller 20 and the safety controller 40 are also connected to the second communication line 37 and perform the data communication through the second communication line 37.

The gyroscope sensor 26 detects the orientation (orientation change amount) of the dump truck 2. The gyroscope sensor 26 is connected to the travel controller 20 and outputs detection data to the travel controller 20. The travel controller 20 calculates the orientation (orientation change amount) of the dump truck 2 on the basis of the detection data of the gyroscope sensor 26.

The speed sensor 27 detects a rotational speed of the wheel 23 and detects a travel speed of the dump truck 2. The speed sensor 27 is connected to the travel controller 20 and outputs detection data to the travel controller 20. The travel controller 20 calculates a travel distance of the dump truck 2 on the basis of the detection data of the speed sensor 27 and time data measured by a timer embedded in the travel controller 20.

The GPS receiver 31 provided on the dump truck 2 detects the absolute position (GPS position) of the dump truck 2. An antenna 31A which receives the data from the positioning satellite 5 and an antenna 31B which receives the correction observation data from the GPS base station 19 are connected to the GPS receiver 31. The antenna 31A outputs a signal based on the data received from the positioning satellite 5 to the GPS receiver 31. The antenna 31B outputs a signal based on the received correction observation data to the GPS receiver 31. The GPS receiver 31 detects a position (GPS position) of the antenna 31A using the data from the positioning satellite 5 and the correction observation data from the GPS base station 19.

In a process of detecting the position of the antenna 31A, the GPS receiver 31 detects which of the Fix solution, Float solution, and Single solution indicating the accuracy the detected GPS position is.

When detecting any one of the Fix solution, Float solution, and Single solution indicating the accuracy of the detected GPS position, the GPS receiver 31 outputs a positioning signal indicating that positioning calculation of the GPS position is performed together with the accuracy of the detected GPS position. When the positioning calculation of the GPS position cannot be performed, the GPS receiver 31 outputs a non-positioning signal indicating non-positioning. The positioning signal or non-positioning signal is output to the travel controller 20 and the scan matching navigation position measurement controller 33 through the travel route creation device 32. In the first embodiment, when the position accuracy of the GPS is the Fix solution, the dump truck 2 may autonomously travel on the basis of the detected GPS position. When the position accuracy of the GPS is the Float solution or Single solution, or when the position calculation of the GPS position cannot be performed, the dump truck 2 cannot autonomously travel on the basis of the detected GPS position.

As illustrated in FIG. 3, the travel route creation device 32 is connected to the wireless communication device 34 to which an antenna 34A is connected. The wireless communication device 34 may receive the command signal or data transmitted from at least one of the management device 10 and the mining machine 4 other than the vehicle on which the wireless communication device 34 is mounted. The mining machine 4 other than the vehicle on which the wireless communication device 34 is mounted includes the mining machine 4 other than the dump truck 2 such as the boring machine, the excavating machine, the loading machine, the transporting machine, and the vehicle driven by the worker; and the dump truck 2 other than the vehicle on which the wireless communication device 34 is mounted.

The wireless communication device 34 receives the command signal transmitted from the wireless communication device 18 of the control facility 7 to output to the travel route creation device 32. The command signal includes travel condition data indicating a travel condition of the dump truck 2 being the vehicle on which the wireless communication device 34 is mounted. The travel condition data includes the course data generated by the processing device 12 and travel speed data of the dump truck 2. The course data of the vehicle on which the wireless communication device 34 is mounted is defined by the XY coordinate system. The travel route creation device 32 receives the course data from the wireless communication device 34 and stores the same in a route position storage unit 32A. The travel route creation device 32 also transmits the position data and orientation data of the dump truck 2 on which the travel route creation device 32 is mounted obtained by detection and the like by the GPS to the wireless communication device 18 of the control facility 7 through the wireless communication device 34. The travel route creation device 32 is connected to the first communication line 35 and transmits the command signal to various controllers such as the scan matching navigation position measurement controller 33 and the travel controller 20.

<Travel Controller>

As is described later, the travel controller 20 receives the position data indicating the GPS position of the dump truck 2 detected by the GPS receiver 31 and the position data indicating the absolute position of the dump truck 2 calculated by the scan matching navigation position calculation unit 33B of the scan matching navigation position measurement controller 33 and allows the dump truck 2 to autonomously travel according to the travel route RP defined by the course data on the basis of at least one of them.

In order to allow the dump truck 2 to autonomously travel according to the travel route RP, the travel controller 20 obtains not only the position data of the dump truck 2 but also the orientation data indicating the orientation (orientation change amount) of the dump truck 2 being the detection data of the gyroscope sensor 26 and the travel speed data indicating the travel speed of the dump truck 2 being the detection data of the speed sensor 27.

In the first embodiment, the dump truck 2 travels according to the travel route RP exclusively in two travel modes. As illustrated in FIG. 8, a first travel mode is the GPS travel mode in which the dump truck 2 is allowed to autonomously travel on the basis of the position and orientation data estimated by dead-reckoning navigation using detection data of the GPS receiver 31, the detection data of the gyroscope sensor 26, and the detection data 27 of the speed sensor 27. When allowing the dump truck 2 to travel in the GPS travel mode, a map data creating process to be described later is performed, and the map data MI created in the map data creating process is stored/updated in the map storage database 36 at any time. As illustrated in FIG. 9, a second travel mode is a scan matching navigation travel mode in which the position and orientation data indicating the absolute position of the dump truck 2 are calculated using scan matching navigation on the basis of the map data MI created/updated in the GPS travel mode and detection data of the laser sensor 24B and the dump truck 2 is allowed to autonomously travel on the basis of the calculated position and orientation data of the dump truck 2. In the scan matching navigation travel mode, the position and orientation data of the dump truck 2 are calculated by the scan matching navigation position calculation unit 33B.

The dead-reckoning navigation is intended to mean navigation to estimate current position and orientation of the object (dump truck 2) on the basis of the orientation (orientation change amount) from a known position and the travel distance (speed). The orientation (orientation change amount) of the dump truck 2 is detected using the gyroscope sensor 26 arranged on the dump truck 2. The travel distance (speed) of the dump truck 2 is detected using the speed sensor 27 arranged in the dump truck 2. The detection signal of the gyroscope sensor 26 and the detection signal of the speed sensor 27 are output to the travel controller 20 of the dump truck 2.

The travel controller 20 generates a control amount regarding the travel of the dump truck 2 such that the dump truck 2 travels according to the course data set on the travel route RP while continuously updating the estimated current position of the dump truck 2 every predetermined period using the dead-reckoning navigation on the basis of the detection signal from the gyroscope sensor 26 and the detection signal from the speed sensor 27. The control amount includes an accelerator signal, a braking signal, and a steering signal. The travel controller 20 controls travel (operation) of the dump truck 2 on the basis of the steering signal, the accelerator signal, and the braking signal.

However, estimation of the position and orientation of the vehicle on which the travel controller 20 is mounted by the dead-reckoning navigation is likely to cause an error due to slight tire slipping and the like. That is, when the travel distance of the dump truck 2 by the dead-reckoning navigation becomes long, a large error might occur between an estimated position (estimated position) and an actual position due to accumulation of the detection error of one or both of the gyroscope sensor 26 and the speed sensor 27. As a result, the dump truck 2 might travel out of the course data generated by the processing device 12.

In the GPS travel mode, the travel controller 20 allows the dump truck 2 to travel while preventing the error accumulated by the dead-reckoning navigation from becoming too large by correcting the position (estimated position) of the dump truck 2 calculated (estimated) by the dead-reckoning navigation using the GPS position data detected by the GPS receiver 31 every predetermined period and orientation data (for example, a direction indicated by a straight line connecting the GPS position data detected this time and the GPS position data detected last time may be used as orientation data). In the scan matching navigation travel mode also, the travel controller 20 allows the dump truck 2 to travel while preventing the error accumulated by the dead-reckoning navigation from becoming too large by correcting the position (estimated position) and the orientation (estimated orientation) of the dump truck 2 calculated (estimated) by the dead-reckoning navigation using scan matching navigation position data and orientation data calculated by the scan matching navigation position calculation unit 33B every predetermined period.

As illustrated in lower portions in FIGS. 10 and 11, a period in which the travel controller 20 estimates the current position of the dump truck 2 by the dead-reckoning navigation on the basis of detection results of the gyroscope sensor 26 and the speed sensor 27 is set to ta [msec]. As illustrated in FIG. 10, the detection signal indicating the GPS position which is a detection result of the GPS receiver 31 is input to the travel controller 20 every tb [msec]. As illustrated in FIG. 10, a frequency of estimation of the position by the dead-reckoning navigation is higher than a frequency of input of the detection signal of the GPS detector 31 to the travel controller 20, that is, a frequency of detection of the GPS position. Therefore, each time the position estimation by the dead-reckoning navigation is performed several times, the GPS position is input to the travel controller 20 and the current position of the dump truck 2 is corrected, so that the error due to the dead-reckoning navigation does not become too large.

As illustrated in FIG. 11, the position data indicating the position and orientation of the dump truck 2 which is the calculation result of the scan matching navigation position calculation unit 33B is input to the travel controller 20 every tc [msec]. As illustrated in FIG. 10, the frequency of the estimation of the position by the dead-reckoning navigation is higher than a frequency of input of the calculation result of the scan matching navigation position calculation unit 33B to the travel controller 20, that is, a frequency of calculation of the scan matching navigation position. Therefore, each time the position estimation by the dead-reckoning navigation is performed several times, the position data by the scan matching navigation position calculation unit 33B is input to the travel controller 20 and the current position of the dump truck 2 is corrected, so that the error due to the dead-reckoning navigation does not become too large.

Meanwhile, with reference to FIGS. 10 and 11, the frequency is such that every time the dead-reckoning navigation is performed several times, the detection signal indicating the GPS position and the position data by the scan matching navigation position calculation unit 33B are input to the travel controller 20; however, the frequency of the dead-reckoning navigation and the frequency of the input of the detection signal indicating the GPS position and the position data by the scan matching navigation position calculation unit 33B to the travel controller 20 may be equally set.

A specific GPS travel mode is described with reference to FIG. 8. The travel controller 20 calculates the position and orientation of the dump truck 2 by the dead-reckoning navigation using the detection data of the speed sensor 27 and the detection data of the gyroscope sensor 26. When the detection data of the GPS receiver 31 is input to the travel controller 20, the position and orientation calculated by the dead-reckoning navigation and the detection data of the GPS receiver 31 are integrated by a Kalman filter KF to calculate more correct position and orientation of the dump truck 2, and the position and orientation are adopted as the current position and orientation of the dump truck 2.

<Scan Matching Navigation Position Measurement Controller>

As illustrated in FIG. 3, the scan matching navigation position measurement controller 33 is provided with a determination unit 33A, the scan matching navigation position calculation unit 33B, a map data creation unit 33C, a storage unit 33D, and a diagnosis unit 33E.

The scan matching navigation position measurement controller 33 is connected to the first communication line 35 and obtains the detection data of the gyroscope sensor 26 and the detection data of the speed sensor 27 through the first communication line 35 and the travel controller 20. The scan matching navigation position measurement controller 33 is also connected to the GPS receiver 31 through the wireless communication device 34, the travel route creation device 32, and the first communication line 35, and obtains the detection data of the GPS receiver 31.

The determination unit 33A determines whether the error of the GPS position detected by the GPS receiver 31 is equal to or smaller than a predetermined error. The determination unit 33A determines whether the solution of the GPS position is the Fix solution. When the solution of the GPS position is the Fix solution, the determination unit 33A determines that the accuracy of the detected GPS position of the dump truck 2 is high and the error of the GPS position is equal to or smaller than a predetermined error (in this case, the GPS travel mode is selected as the travel mode by the travel controller 20). When the solution of the GPS position is the Float solution or Single solution, or the GPS position is non-positioning, the determination unit 33A determines that the accuracy of the detected GPS position of the dump truck 2 is low and the error of the GPS position is larger than a predetermined error (in this case, the scan matching navigation travel mode is selected as the travel mode in the travel controller 20). Meanwhile, a predetermined error is the error (accuracy) of the GPS position with which the dump truck 2 may autonomously travel according to the travel route RP by the dead-reckoning navigation to be described later. In the first embodiment, the GPS receiver 31 detects the GPS position and the solution, but another device (for example, the determination unit 33A) may detect the solution.

When the determination unit 33A determines that the error of the GPS position of the dump truck 2 detected by the GPS receiver 31 is equal to or smaller than a predetermined error (that is, in the GPS travel mode), the map data creation unit 33C detects the position of the bank BK provided on at least one of the outside of the loading area LPA, the outside of the earth discharging area DPA, and the outside of the conveyance path HL on the basis of the position and orientation of the dump truck 2 calculated by the above-described method and a detection result of the laser sensor 24B, and stores position data of the bank BK in the map storage database 36 as the map data MI of the travel route RP at any time. The map data creation unit 33C integrates the position and orientation of the dump truck 2 and the detection result of the laser sensor 24B, removes the detection results other than the bank BK (for example, various noises, the ground and the like) from the integrated data, and detects the position of the bank BK. The map data creation unit 33C stores the same in the map storage database 36. As illustrated in FIGS. 12 and 13, the map data MI indicates a position in the XY coordinate system of a grid GR obtained by dividing the mine with a predetermined size in plan view, and indicates whether the bank BK is present in each grid GR. Each grid GR of the map data MI includes binary data (one-bit data) indicating whether the bank BK is present, that is, the data of "0" or "1". As illustrated in FIGS. 12 and 13, in the first embodiment, each grid GR of the map data MI is indicated by a black square in the drawing as "1" when there is the bank BK, and is indicated by a white square in the drawing as "0" when there is no bank BK. Meanwhile, the map data may be prepared not as the binary data of only "0" and "1", but as continuous value data from 0 to 1 (for example, 0.5). For example, the numerical value may be gradually increased from 0 to 1 as an upper limit on the basis of the number of times the bank BK is detected in a certain grid GR.

The map storage database 36 stores the position data of the bank BK as the map data MI. The map storage database 36 is connected to the first communication line 35. The map storage database 36 is an external storage device (auxiliary storage device) formed of at least one of a ROM, a flash memory, and a hard disk drive. The map storage database 36 stores the detection result regarding the bank BK as the map data MI each time the map data creation unit 33C detects the same. In the first embodiment, the map data MI stored in the map storage database 36 is overwritten each time the map data creation unit 33C detects the bank BK. Overwriting is intended to mean changing to "1" if the bank BK is detected in the grid of "0" and maintaining "1" even if no bank BK is detected in the grid of "1"; however, the present invention is not limited to this embodiment and the grid of "1" may also be changed to "0".

The storage unit 33D is a main storage device (internal storage device) with a higher operation speed than that of the map storage database 36.

When the determination unit 33A determines that the error of the GPS position of the dump truck 2 detected by the GPS receiver 31 is larger than a predetermined error (that is, in the scan matching navigation travel mode), the scan matching navigation position calculation unit 33B calculates the position and orientation of the dump truck 2 on the basis of the detection result of the gyroscope sensor 26, the detection result of the speed sensor 27, the detection result of the laser sensor 24B, and the map data MI read from the map storage database 36 into the storage unit 33D to be stored in the storage unit 33D. Meanwhile, the scan matching navigation position calculation unit 33B may also directly call the map data MI from the map storage database 36 without using the storage unit 33D to calculate the position and orientation of the dump truck 2.

As is described later, the diagnosis unit 33E obtains the detection data of the GPS receiver 31 and calculation data of the scan matching navigation position calculation unit 33B. The diagnosis unit 33E compares the GPS position (absolute position) of the dump truck 2 derived from the detection data of the GPS detector 31 with the absolute position of the dump truck 2 calculated by the scan matching navigation position calculation unit 33B, thereby diagnosing the accuracy of the detection data of the GPS detector 31.

As illustrated in FIG. 9, in the scan matching navigation travel mode, the scan matching navigation position calculation unit 33B integrates the detection data of the gyroscope sensor 26, the detection data of the speed sensor 27, the detection data of the laser sensor 24B, and the map data MI stored in the map storage database 36 by a particle filter PF to calculate the position and orientation of the dump truck 2. A specific calculation method is described later.

Also, as illustrated in FIG. 3, the scan matching navigation position measurement controller 33 is provided with an observation point coordinate conversion unit 38 and an observation point availability determination unit 39. The observation point coordinate conversion unit 38 converts the position of the detection result of the laser sensor 24B indicated by coordinates defined by the direction and distance from the laser sensor 24B into the XY coordinate system in consideration of the position and orientation of the vehicle on which the observation point coordinate conversion unit 38 is mounted. The position of the detection result the coordinates of which are converted by the observation point coordinate conversion unit 38 is defined by a height direction (Z-axis direction) orthogonal to the X-axis direction and the Y-axis direction in addition to the X-axis direction and the Y-axis direction. The observation point availability determination unit 39 removes various noises, detection results at a predetermined height or lower from the ground surface (ground) and the like from the detection results the coordinates of which are converted by the observation point coordinate conversion unit 38 as described above. The observation point availability determination unit 39 outputs a synthesized detection result to both the map data creation unit 33C (used for creating map data in the GPS travel mode) and the scan matching navigation position calculation unit 33B (used for calculating position and orientation of the vehicle on which the scan matching navigation position calculation unit 33B is mounted in the scan matching navigation travel mode).

The safety controller 40 obtains relative positions of the dump truck 2 and the object (bank BK, side wall, obstacle and the like) on the basis of the detection signals of the radar 24A and the laser sensor 24B. The safety controller 40 generates a command for controlling at least one of an accelerator, a braking device 23B, and the steering device 2S using the relative position with respect to the object, and outputs the same to the travel controller 20. The travel controller 20 controls the dump truck 2 on the basis of the command obtained from the safety controller 40 to avoid collision of the dump truck 2 with the object.

<Method of Determining Travel Mode>

Figure 14:
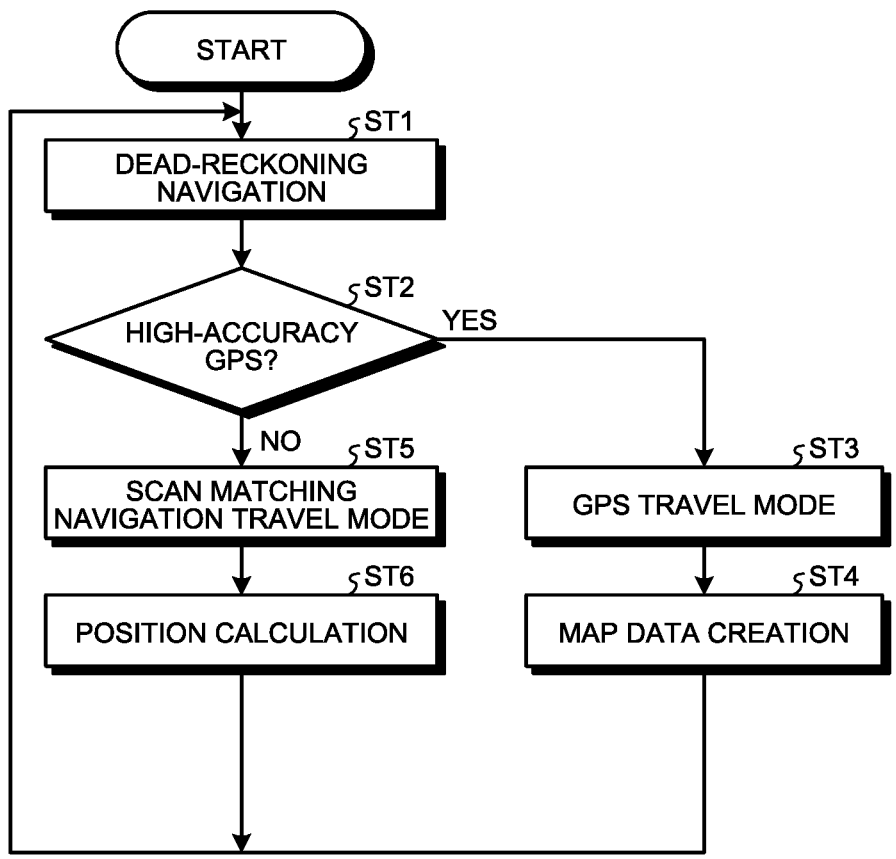
FIG. 14 is an example of a flowchart of the control system according to the first embodiment.
Figure 15:
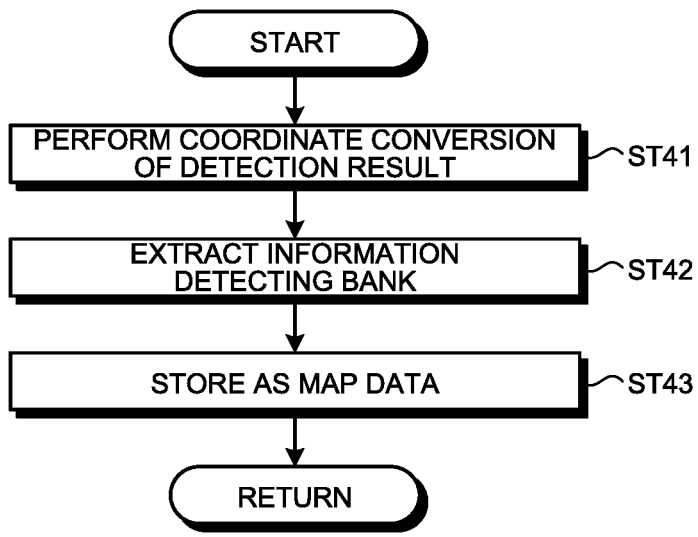
FIG. 15 is an example of a flowchart of step ST4.
Figure 16:
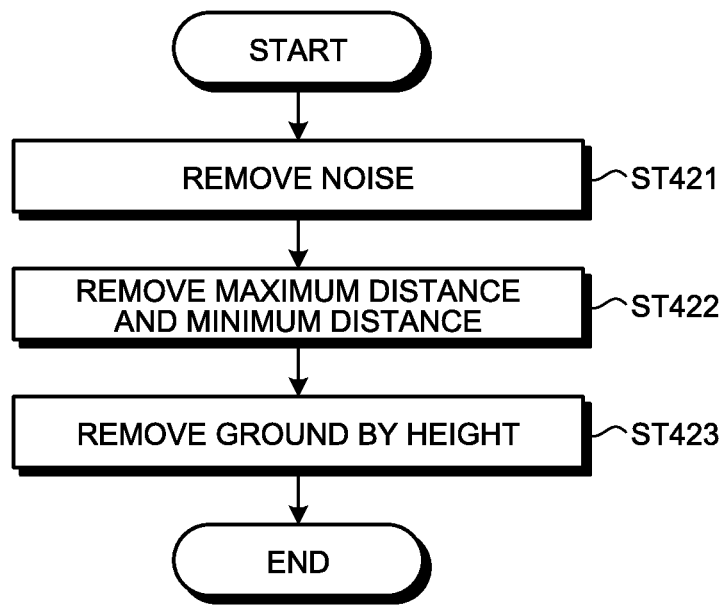
FIG. 16 is an example of a flowchart of step ST42.
Figure 17:
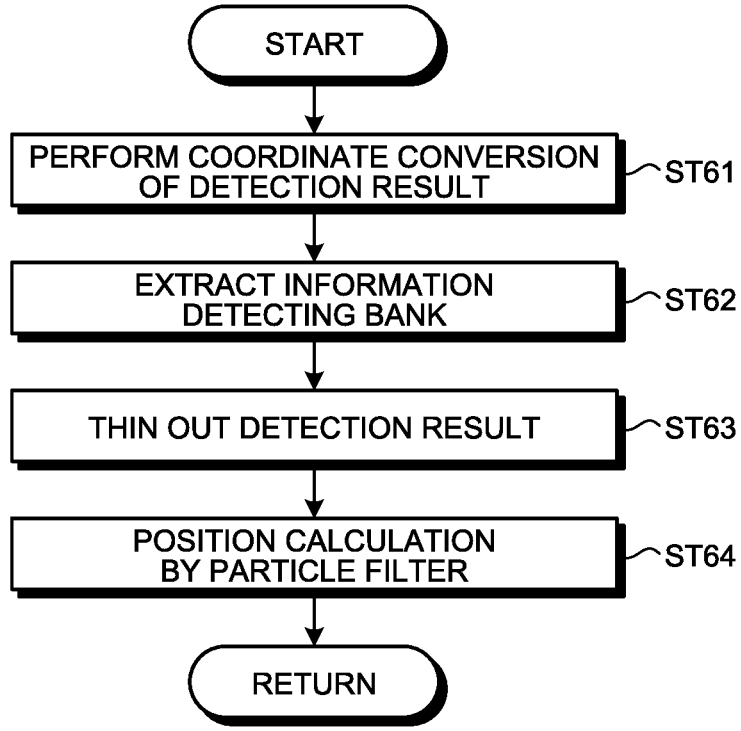
FIG. 17 is an example of a flowchart of step ST6.
Figure 18:
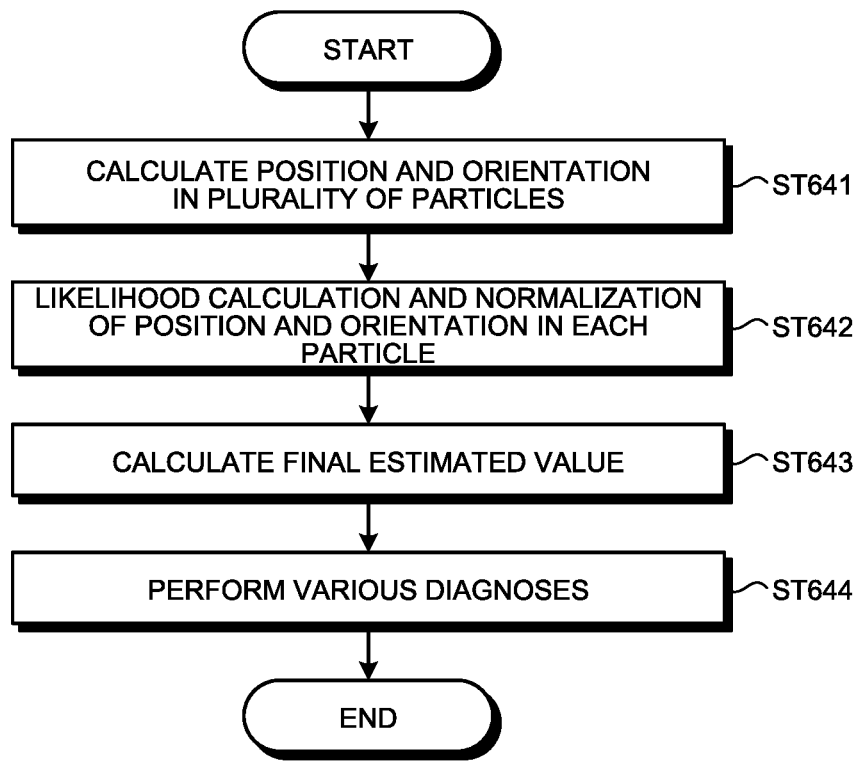
FIG. 18 is an example of a flowchart of step ST64.
Figure 19:
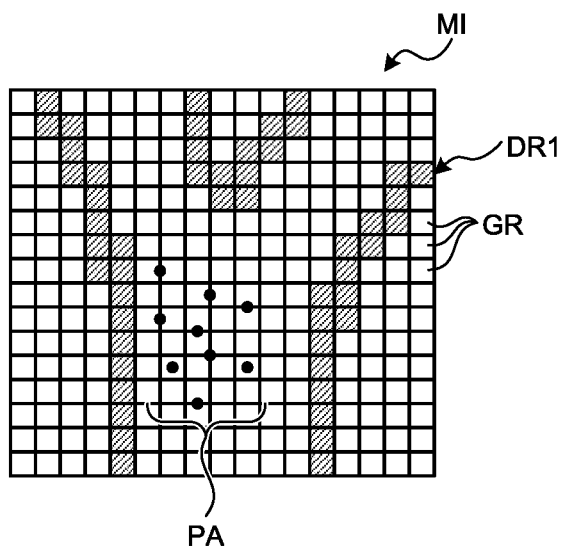
FIG. 19 is a view illustrating an example of a partial area of the map data read from the map storage database into the storage unit according to the first embodiment.
Figure 20:
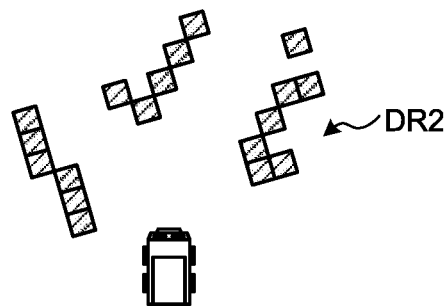
FIG. 20 is a view illustrating an example of a detection result actually detected by a laser sensor of the control system according to the first embodiment.
Figure 21:
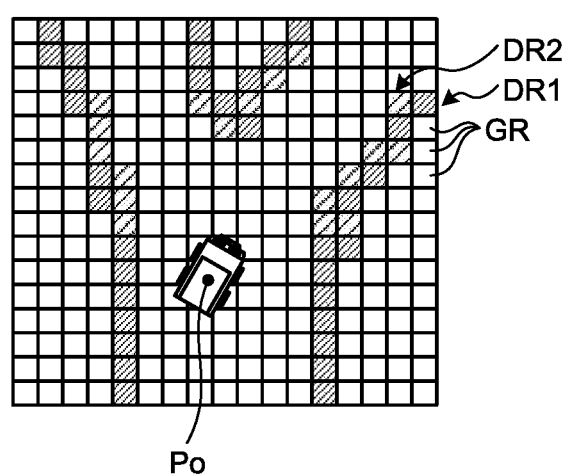
FIG. 21 is a view illustrating an example of a state in which the scan matching navigation position calculation unit calculates position and orientation of a vehicle on which this is mounted on the basis of the detection result actually detected by the laser sensor of the control system according to the first embodiment.

Next, an example of the travel mode of the dump truck 2 according to the first embodiment is described. FIG. 14 is an example of a flowchart of the control system 30 according to the first embodiment. FIG. 15 is an example of a flowchart of step ST4 in FIG. 14. FIG. 16 is an example of a flowchart of step ST42 in FIG. 15. FIG. 17 is an example of a flowchart of step ST6 in FIG. 14. FIG. 18 is an example of a flowchart of step ST64 in FIG. 17. FIG. 19 is a view illustrating an example of a partial area of the map data MI read from the map storage database 36 into the storage unit 33D according to the first embodiment. FIG. 20 is a view illustrating an example of the detection result actually detected by the laser sensor 24B of the control system 30 according to the first embodiment. FIG. 21 is a view illustrating an example of a state in which the scan matching navigation position calculation unit 33B calculates the position and orientation of the vehicle on which the scan matching navigation position calculation unit 33B is mounted on the basis of the detection result actually detected by the laser sensor 24B of the control system 30 according to the first embodiment.

The travel controller 20 of the control system 30 executes step ST1 of allowing the dump truck 2 to travel by the dead-reckoning navigation according to the course data set on the travel route RP. Meanwhile, as illustrated in FIGS. 10 and 11, when the frequency of the estimation of the position by the dead-reckoning navigation is higher than the frequency of the detection of the GPS position from the GPS receiver 31, the dead-reckoning navigation is performed a plurality of times at step ST1.

Next, after the GPS receiver 31 detects the GPS position, the determination unit 33A of the scan matching navigation position measurement controller 33 executes step ST2 of determining whether the error of the GPS position of the dump truck 2 detected by the GPS receiver 31 is equal to or smaller than a predetermined error, that is, whether the accuracy of the GPS position is high. Specifically, the determination unit 33A of the scan matching navigation position measurement controller 33 determines whether the solution of the GPS position detected by the GPS receiver 31 is the Fix solution. When the determination unit 33A of the scan matching navigation position measurement controller 33 determines that the solution of the GPS position detected by the GPS receiver 31 is the Fix solution, that is, determines that the error of the GPS position of the dump truck 2 detected by the GPS receiver 31 is equal to or smaller than a predetermined error (step ST2: Yes), this transmits a determination result to the travel controller 20, and the travel controller 20 shifts to the GPS travel mode or when the mode is already the GPS travel mode, the GPS travel mode is continued (ST3).

Next, the map data creation unit 33C executes the map data creating process (step ST4), and the map data creation unit 33C creates the map data MI. Specifically, the scan matching navigation position measurement controller 33 allows the dump truck 2 to autonomously travel according to the course data stored in the route position storage unit 32A on the basis of the GPS position of the dump truck 2 detected by the GPS receiver 31 and the position and orientation calculated by the dead-reckoning navigation, and executes step ST4 of extracting the detection result regarding the bank BK from the detection results of the laser sensor 24B and storing the extracted detection result regarding the bank BK in the map storage database 36 as the map data MI of the travel route RP.

In detail, first, the observation point coordinate conversion unit 38 converts the position of the detection result of the laser sensor 24B indicated by the coordinates defined by the direction and the distance from the laser sensor 24B to the position of the coordinates indicated by the XY coordinates in consideration of the position and orientation of the dump truck 2 (step ST41).

The observation point availability determination unit 39 extracts the detection result regarding the bank BK from the detection results the coordinates of which are converted by the observation point coordinate conversion unit 38 (step ST42). When extracting the detection result regarding the bank BK, the observation point availability determination unit 39 first removes various noises of the detection result the coordinates of which are converted by the observation point coordinate conversion unit 38 (step ST421). Specifically, the observation point availability determination unit 39 removes as the noise, a detection result with low reflection intensity, a detection result considered to be obtained by passage of the laser beam through a transparent object, a detection result considered to be obtained by detection of dust by the laser beam, a detection result considered to be reflection of the laser beam by the ground, and a detection result considered to be obtained by detection of clods of earth on the ground by the laser beam from the detection results the coordinates of which are converted by the observation point coordinate conversion unit 38.

The observation point availability determination unit 39 removes a detection result in which the distance is equal to or longer than the maximum distance and a detection result in which the distance is equal to or shorter than the minimum distance from the detection results the coordinates of which are converted by the observation point coordinate conversion unit 38 (step ST422). In the first embodiment, the detection result in which the distance is equal to or longer than the maximum distance is removed for removing the noise by the sunlight, and the detection result in which the distance is equal to or shorter than the minimum distance is removed for removing the noise by dark dust occurring at a short distance from the laser sensor 24B.

The observation point availability determination unit 39 removes the detection result at a predetermined height or lower from the ground surface from the detection results the coordinates of which are converted by the observation point coordinate conversion unit 38 (step ST423). The detection result at a predetermined height or lower from the ground surface is removed for removing detection of the clods of earth and the like located on the conveyance path other than the bank BK. In this manner, the observation point availability determination unit 39 removes the various noises and the like from the detection results, thereby extracting the detection result regarding the bank BK from all the detection results of the laser sensor 24B. By these processes, the number of detection results of the laser sensor 24B before processing may be significantly reduced, and a calculation load and a communication load in each controller may be reduced.

The observation point availability determination unit 39 outputs the detection result from which the various noises and the like are removed to the map data creation unit 33C, and the map data creation unit 33C overwrites the position of the bank BK being the above-described detection result the position of which is indicated in the XY coordinate system to store in the map storage database 36 as the map data MI formed of the grid GR (step ST43). As described above, "overwriting" is intended to mean changing to the "1" (present) state when the detection result indicating that the bank BK is newly detected in the grid in the "0" (not present) state so far is input, and maintaining the "1" state even if the detection result indicating that no new bank is present in the grid in the "1" state so far is inputted. The control system 1 extracts the detection result regarding the bank BK from the detection results of the laser sensor 24B and continuously overwrites to store the extracted detection result regarding the bank BK in the map data MI of the travel route RP at any time while the error of the GPS position of the dump truck 2 detected by the GPS receiver 31 is equal to or smaller than a predetermined error and the GPS travel mode is continued by executing steps ST1 to ST4.

When the determination unit 33A of the scan matching navigation position measurement controller 33 determines that the solution of the GPS position detected by the GPS receiver 31 is not the Fix solution, that is, determines that the error of the GPS position of the dump truck 2 detected by the GPS receiver 31 is larger than a predetermined error (step ST2: No), this transmits the determination result to the travel controller 20, and the travel controller 20 shifts to the scan matching navigation travel mode, or when the mode is already the scan matching navigation travel mode, the scan matching navigation travel mode is continued (ST5).

Specifically, on the basis of the detection data of the laser sensor 24B and the map data MI stored in the map storage database 36 and read into the storage unit 33D, the scan matching navigation position calculation unit 33B calculates the position and orientation of the dump truck 2 and allows the dump truck 2 to travel according to the travel route RP (step ST6). That is, the scan matching navigation position measurement controller 33 calculates the position and orientation of the dump truck 2 by checking the detection result of the laser sensor 24B with the map data MI stored in the map storage database 36. Meanwhile, even in the scan matching navigation travel mode, when the frequency of the dead-reckoning navigation and the calculation frequency of the position and orientation by the scan matching navigation position calculation unit 33B are in the state as illustrated in FIG. 11, after the dead-reckoning navigation is performed several times, the position and orientation are calculated by the scan matching navigation position calculation unit 33B. In such a case, the position and orientation calculated by the scan matching navigation position calculation unit 33B may be adopted as the current position and orientation of the dump truck 2 in place of the position and orientation of the dump truck 2 estimated so far by the dead-reckoning navigation.

Specifically, the observation point coordinate conversion unit 38 converts the position of the detection result of the laser sensor 24B indicated by the coordinates defined by the direction and the distance from the laser sensor 24B to the position of the XY coordinates in consideration of the current position and orientation of the dump truck 2 (step ST61). The observation point availability determination unit 39 extracts the detection result regarding the bank BK from the detection results the coordinates of which are converted by the observation point coordinate conversion unit 38 (step ST62). Meanwhile, since step ST61 is the same as step ST41, and step ST62 is the same as step ST42, the detailed description thereof is omitted.

The scan matching navigation position calculation unit 33B further thins out the detection results obtained by removing the noise by the observation point availability determination unit 39 (step ST63). Specifically, among the detection results by the laser sensor 24B, the detected points at a short distance from one another do not contribute much to the accuracy of the position measurement from a geometrical relationship. For this reason, only the detection results separated at a predetermined distance out of the detection results are left, and other detection results are removed. By the process at step ST63, the detection results of the laser sensor 24B may be significantly reduced, and the calculation load in the subsequent scan matching navigation position calculation unit 33B may be reduced.

As described above, the scan matching navigation position calculation unit 33B integrates the detection data of the gyroscope sensor 26, the detection data of the speed sensor 27, the detection data of the laser sensor 24B, and the map data MI stored in the map storage database 36 to be read into the storage unit 33D by the particle filter PF to calculate the position and orientation of the dump truck 2 (step ST64).

As illustrated in FIG. 19, although the scan matching navigation position calculation unit 33B calculates the current position and orientation of the dump truck from the detection result of the laser sensor 24B on the basis of the map data MI read from the map storage database 36 into the storage unit 33D, due to a calculation cost, a data amount of the map data MI and a detection data amount of the laser sensor 24B are finite, and it is realistically difficult to instantaneously calculate the true position and orientation of the dump truck 2 from the detection result of the laser sensor 24B. Therefore, as described below, the position and orientation of the dump truck 2 closer to true values are calculated while reducing the calculation cost using a plurality of points (particles) PA virtually arranged within a range in which the dump truck 2 is expected to be present at a certain point in time.

Specifically, the scan matching navigation position calculation unit 33B virtually arranges a plurality of particles PA within the range in which the dump truck 2 is expected to be present at a certain point in time on the basis of the detection data of the gyroscope sensor 26 and the detection data of the speed sensor 27 and calculates the position and orientation in each particle PA (step ST641). Meanwhile, the dead-reckoning navigation may also be used to calculate the position and orientation in each particle PA.

In the map data MI illustrated in FIG. 19, each square is a grid GR. A colored grid DR1 is the grid in which the bank BK is detected, and a white grid is the grid in which the bank BK is not detected. FIG. 20 illustrates detection data DR2 actually detected by the laser sensor 24B. Following step ST641, likelihood calculation is performed for each of a plurality of particles illustrated in FIG. 19 (ST642). Specifically, an expected detection result of expectation that the bank will be detected when the bank BK is detected using the laser sensor 24B from the position and orientation of a certain particle PA calculated at step ST641 is checked with the detection data DR2 actually detected by the laser sensor 24B illustrated in FIG. 20, and likelihood calculation (scoring) is performed for each particle from a degree of coincidence. The score (likelihood) increases as the grid DR1 in which the bank BK is detected in the map data MI coincides with the detection data DR2 actually detected by the laser sensor 24B more. Such likelihood calculation is performed for each particle, and the calculated likelihood is normalized (step ST642).

A process such as weighting is performed on the basis of the position and orientation of each particle PA and the likelihood of each particle, and finally, a final estimated value (expected value) PO of the position and orientation in which the dump truck 2 is most likely to be present is calculated (step ST643). That is, the final estimated value PO is not necessarily selected from the position where any of the particles PA is present. As illustrated in FIG. 21, according to the above-described method, the scan matching navigation position calculation unit 33B calculates the position and orientation (final estimated value PO) of the dump truck in which the grid DR1 in which the bank BK is detected in the map data MI is most similar to the detection data DR2 actually detected by the laser sensor 24B. When the final estimated value PO is calculated, the scan matching navigation position calculation unit 33B also calculates estimation accuracy and reliability of the final estimated value PO (step ST643). Meanwhile, in FIGS. 19 to 21, the grid GR where the bank BK is present is indicated by dense parallel shaded lines, and the actual detection result of the bank BK is indicated by coarse parallel shaded lines.

The scan matching navigation position calculation unit 33B performs various diagnoses on the calculated position and orientation of the dump truck 2 (step ST644). Specifically, the scan matching navigation position calculation unit 33B discards the calculated position and orientation of the dump truck 2 and performs similar calculation again when the calculated position and orientation of the dump truck 2 are calculated from the detection result detected while the laser sensor 24B is in failure, calculated from the detection result detected while the gyroscope sensor 26 is in failure, calculated from the detection results of the laser sensor 24B fewer than the predetermined number, when the reliability is lower than predetermined reliability, when overall likelihood of each particle is lower than a predetermined value, when the estimation accuracy is lower than a predetermined value, when deviation from the position and orientation estimated by the dead-reckoning navigation is larger than a predetermined value, or when the position and orientation are detected using the map data MI having a problem. Meanwhile, the travel controller 20 may also output a command for controlling the braking device 23B which stops the vehicle body 21 when a state corresponding to any one of the above-described conditions continues for a predetermined period by the various diagnoses.

If the calculated position and orientation of the dump truck 2 do not correspond to the various diagnoses at step ST644, the scan matching navigation position calculation unit 33B regards the calculated position and orientation as the current position and direction of the dump truck, the travel controller 20 executes again the dead-reckoning navigation (step ST1) and controls the travel (operation) of the dump truck 2 such that the dump truck 2 travels according to the travel route RP. In this manner, in the control system 30, the travel controller 20 allows the dump truck 2 to travel by the dead-reckoning navigation according to the travel route RP on the basis of the position and orientation of the dump truck 2 calculated by the scan matching navigation position measurement controller 33 while the position and orientation of the dump truck 2 are continuously calculated by checking the detection result of the laser sensor 24B with the map data MI of the travel route RP stored in the map storage database 36 while the error of the GPS position of the dump truck 2 detected by the GPS receiver 31 is larger than a predetermined error and the scan matching navigation travel mode is continued by executing steps ST1, ST2, ST5, and ST6.

<Diagnostic Method of Detection Data of GPS Detector 31>

As described above, when the dump truck 2 travels the travel route RP, the current position and orientation of the dump truck 2 derived by the dead-reckoning navigation are corrected on the basis of the GPS position detected by the GPS receiver 31 in the case of the GPS travel mode and on the basis of the position and orientation calculated by the scan matching navigation position calculation unit 33B in the case of the scan matching navigation travel mode. In the following description, the control of the travel of the dump truck 2 using the GPS position being the detection data detected by the GPS receiver 31 is appropriately referred to as GPS travel, and the control of travel of the dump truck 2 using the position and orientation calculated by the scan matching navigation position calculation unit 33B is appropriately referred to as scan matching navigation travel.

In the GPS travel, there is a possibility that an error is included in the position data of the dump truck 2 obtained by the GPS receiver 31 due to a phenomenon called multipath, for example. At a mining site of the mine, there is a case in which high mountains are present around the dump truck 2. When mining is performed by a method of open-pit mining, there is a case in which wall surfaces are formed around the dump truck 2. Due to influence of these mountains or wall surfaces, the possibility of multipath generation increases. When the multipath is generated, the accuracy of the position data of the dump truck 2 obtained by the GPS receiver 31 decreases.

In the first embodiment, a degree of the error of the detection data detected by the GPS receiver 31 is diagnosed by the determination unit 33A. The determination unit 33A diagnoses the error (accuracy) of the detection data of the GPS detector 31 by determining whether the solution of the GPS position is the Fix solution. However, when the multipath phenomenon occurs, in the diagnosis using the determination unit 33A, there is a possibility that the error of the detection data of the GPS detector 31 becomes large even though the solution is determined as the Fix solution, and it becomes difficult for the dump truck 2 to travel along the travel route RP correctly in the GPS travel mode.

A method of diagnosing the detection data of the GPS receiver 31 by comparing the position of the dump truck 2 estimated by the dead-reckoning navigation with the position of the dump truck 2 detected using the GPS receiver 31 is considered. However, since the estimated position of the dump truck 2 by the dead-reckoning navigation is not highly accurate itself due to tire slipping and the like, there is a possibility that accurate diagnosis becomes difficult even in the diagnosis using the dead-reckoning navigation.

In the first embodiment, the diagnosis unit 33E diagnoses the detection data of the GPS receiver 31 using the position data of the dump truck 2 calculated by the scan matching navigation position calculation unit 33B. The diagnosis unit 33E compares the position of the dump truck 2 derived from the detection data of the GPS detector 31 with the position of the dump truck 2 calculated by the scan matching navigation position calculation unit 33B and diagnoses the detection data of the GPS detector 31. The position of the dump truck 2 calculated by the scan matching navigation position calculation unit 33B is a result obtained after carrying out the various diagnoses at step ST644 and certain accuracy and reliability are recognized, so that this may be used as a comparison target.

Meanwhile, in the calculation of the position of the dump truck 2 by the scan matching navigation position calculation unit 33B, the map data MI is used. The map data MI is created on the basis of the detection data of the GPS detector 31 and the detection data of the laser sensor 24B. In the map data creating process, there is a possibility that the multipath phenomenon occurs and an error is included in the detection data of the GPS detector 31. The presence or absence of occurrence of the error of the position data due to the multipath or the degree of error are influenced by a land form or the ionosphere. The land form of the mine changes daily by a mining operation. That is, depending on the progress of the mining operation, the presence or absence of occurrence of the multipath or the degree of occurrence changes day by day. It is also said that the presence or absence of occurrence of the multipath or the degree of occurrence due to the influence of the ionosphere changes according to a period of time and a period of year. Therefore, by periodically recreating (updating) the map data, or performing the map data creating process in each of a plurality of different periods and integrating (for example, averaging) the map data created in each period, it is possible to create the map data with reduced influence of multipath. That is, the map data with high reliability may be created by periodically updating the map data or by integrating a plurality of map data created in each of different periods. By using the map data, the error of the position of the dump truck 2 calculated by the scan matching navigation position calculation unit 33B is reduced.

Figure 22:
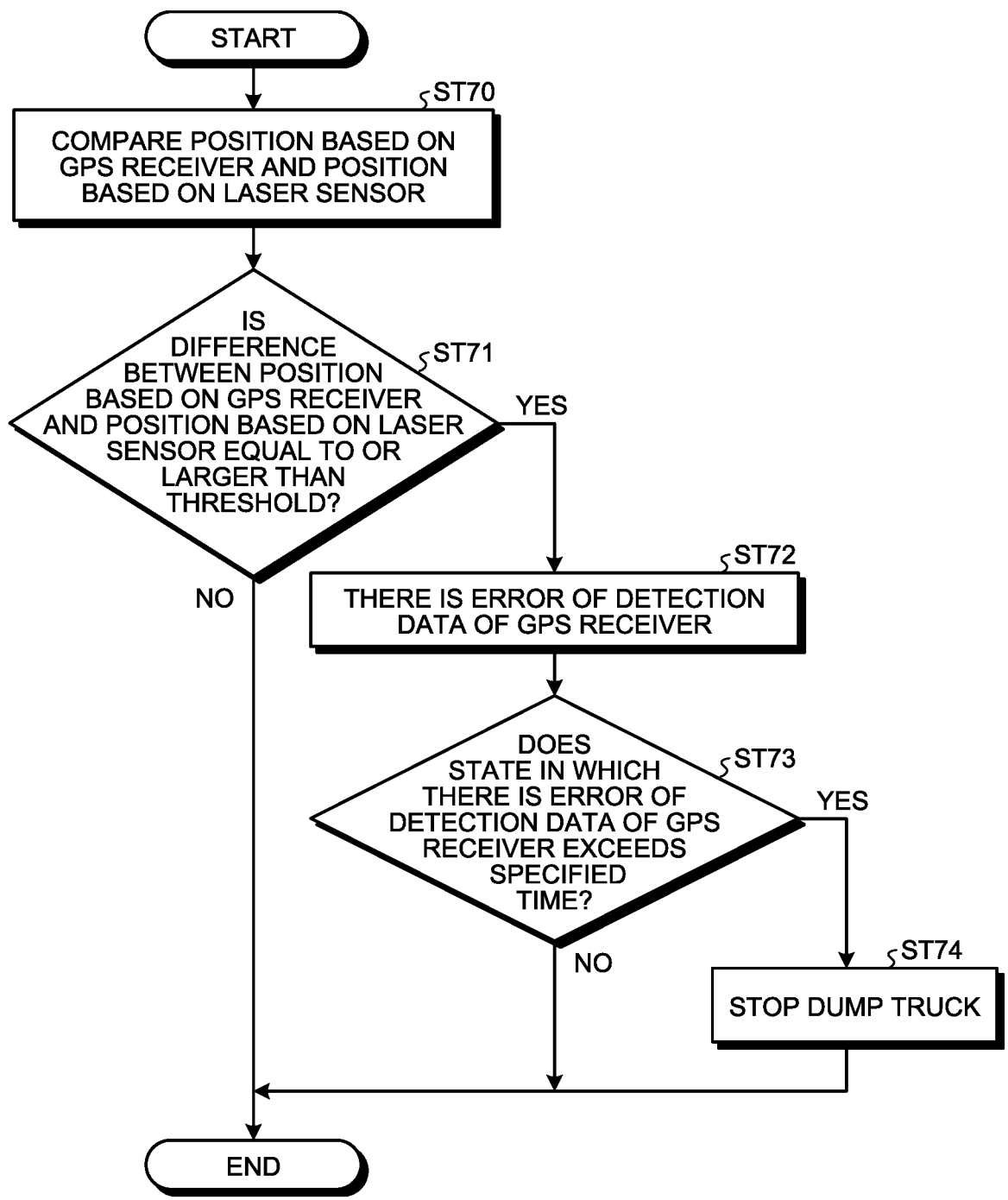
FIG. 22 is a flowchart illustrating an example of a GPS diagnosis method according to the first embodiment.

Next, an example of a diagnostic method of the GPS receiver 31 is described. FIG. 22 is a flowchart illustrating the diagnostic method of the GPS receiver 31 according to the first embodiment.

In the GPS travel mode, the dump truck 2 travels the travel route RP. During the travel of the dump truck 2, the GPS detector 31 receives the radio wave from the GPS satellite 5 and outputs the detection data to the diagnosis unit 33E. At the same time, the laser sensor 24B detects the bank BK. The detection result by the laser sensor 24B is output to both the scan matching navigation position calculation unit 33B and the map creation unit 33C through the observation point coordinate conversion unit 38 and the observation point availability determination unit 39. In the above-described assumption description, the scan matching navigation position calculation unit 33B does not need to calculate the position of the dump truck 2 in the GPS travel mode, but in this embodiment, the scan matching navigation position calculation unit 33B calculates the position data of the dump truck 2 by checking the map data stored in the map storage database 36 to be read into the storage unit 33D with the detection data of the laser sensor 24B. The scan matching navigation position calculation unit 33B outputs the calculated position data of the dump truck 2 to the diagnosis unit 33E.

The diagnosis unit 33E compares the position of the dump truck 2 derived from the detection data of the GPS detector 31 with the position of the dump truck 2 calculated by the EMS position calculation unit 33B (step ST70).

The diagnosis unit 33E determines whether a difference (distance and the like) between the position of the dump truck 2 derived from the detection data of the GPS detector 31 and the position of the dump truck 2 calculated by a scan matching navigation position calculation unit 3B is equal to or larger than a threshold (step ST72).

If it is determined at step ST72 that the difference between the position derived on the basis of the GPS detector 31 and the position calculated by the scan matching navigation position calculation unit 33B is smaller than the threshold (step ST72: No), it is determined that there is no abnormality in the GPS detector 31 and the procedure ends.

If it is determined at step ST72 that the difference between the position derived on the basis of the GPS detector 31 and the position calculated by the scan matching navigation position calculation unit 33B is equal to or larger than the threshold (step ST72: Yes), it is determined that there is abnormality in the detection data of the GPS detector 31 (step ST73).

When it is determined that the difference between the position derived on the basis of the GPS detector 31 and the position calculated by the scan matching navigation position calculation unit 33B is equal to or larger than the threshold by the diagnosis unit 33E at step ST72, and determined that there is the abnormality in the detection data of the GPS receiver 31 at step ST73, the diagnosis unit 33E determines whether a state in which the difference is equal to or larger than the threshold exceeds a specified time (step ST74).

If it is determined by the diagnosis unit 33E that the state in which the difference is equal to or larger than the threshold (state in which there is an error in the detection data of the GPS receiver 31) does not exceed the specified time at step ST74 (step ST74: No) the procedure ends.

When it is determined by the diagnosis unit 33E that the state in which the difference is equal to or larger than the threshold (state in which there is the error in the detection data of the GPS receiver 31) exceeds the specified time at step ST74 (step ST74: Yes), the travel controller 20 serving as a travel control unit stops the travel of the dump truck 2 (step ST75).

Meanwhile, when it is determined at step ST72 that the difference between the position derived on the basis of the GPS detector 31 and the position calculated by the scan matching navigation position calculation unit 33B is equal to or larger than the threshold by the diagnosis unit 33E, the travel controller 20 may allow the dump truck 2 to travel on the basis of the set course data by switching to the scan matching navigation travel mode without using the GPS travel mode. The timing to switch to the scan matching navigation travel mode may be when the above-described difference is determined to be equal to or larger than the threshold even once or when it is determined that the state in which the difference is not smaller than the threshold exceeds the specified time.

When it is determined at step ST71 that the difference between the position derived on the basis of the GPS detector 31 and the position calculated by the SMN position calculation unit 33B is equal to or larger than the threshold by the diagnosis unit 33E, it may be determined that there is the abnormality in either the detection data of the GPS receiver 31 or the calculation result of the SMN position calculation unit 33B.

Furthermore, when it is determined that there is the abnormality in either the detection data of the GPS receiver 31 or the calculation result of the SMN position calculation unit 33B and when the estimation accuracy and the reliability of the calculation result of the SMN position calculation unit 33B are equal to or lower than predetermined values, the travel may be continued in the GPS travel mode.

<Action and Effect>

As described above, according to the first embodiment, the detection data of the GPS detector 31 is diagnosed by using the position data of the dump truck 2 calculated by the scan matching navigation position calculation unit 33B, so that it is possible to diagnose the position data accuracy obtained by the GPS detector 31 and the abnormality of the GPS detector 31 itself without the influence of the multipath and the like. As described above, when the multipath phenomenon occurs, self-diagnosis by the GPS receiver 31 becomes difficult. In the diagnosis using the dead-reckoning navigation, the diagnostic accuracy might be deteriorated due to the influence of the slipping and the like of the dump truck 2. According to the first embodiment, since the detection data of the GPS detector 31 is diagnosed using the position data of the dump truck 2 calculated by the scan matching navigation position calculation unit 33B, the accuracy of position data obtained by the GPS detector 31 and the abnormality of the GPS detector 31 itself may be diagnosed. When it is diagnosed that the position data obtained by the GPS detector 31 includes the error of a predetermined value or larger or that the GPS detector 31 has the abnormality, it is possible to appropriately control the travel of the dump truck 2 by switching from the GPS travel mode to the scan matching navigation travel mode.

According to the first embodiment, in a case in which the diagnosis unit 33E determines that the state in which the difference between the position of the dump truck 2 derived from the detection data of the GPS detector 31 and the position of the dump truck 2 calculated by the scan matching navigation position calculation unit 33B is equal to or larger than the threshold exceeds the specified time, the travel controller 20 stops the travel of the dump truck 2. According to this, it is possible to prevent damage on the dump truck 2 in advance.

Other Embodiments

Meanwhile, in the above-described first embodiment, the detection data of the laser sensor 24B out of the contactless sensor 24 is used at the time of the scan matching navigation travel and in the map data creating process. In at least one of the scan matching navigation travel and the map data creating process, the detection data of the radar 24A out of the contactless sensor 24 may also be used. Meanwhile, the contactless sensor 24 may be any ranging sensor capable of measuring the relative position of the dump truck 2 with respect to the object around the same. For example, a camera which obtains an optical image of the object around the dump truck 2 may also be used as the contactless sensor 24.

The components of the above-described embodiments include the component easily conceived of by one skilled in the art, the substantially identical component, and a so-called equivalent component. The components of the embodiments described above may be appropriately combined. There is a case in which a part of the components is not used.

Although the course data and a target travel speed are set by the processing device 12 in the above-described embodiment, the processing device 12 may provide only the course data and the travel controller 20 may set the target travel speed.

Although the method illustrated in the flowcharts of FIGS. 17 and 18 is used as the method of calculating the position and orientation of the dump truck 2 by the scan matching navigation position calculation unit 33B in the above-described embodiment, the method is not limited to this, and any method may be used as long as this is a method of comparing the detection result by the laser sensor 24B with the stored map data to calculate the current position and orientation of the dump truck 2.

Although it is determined whether the solution of the GPS position detected by the GPS receiver 31 is the Fix solution when determining whether the accuracy of the GPS position is high in the above-described embodiment, there is no limitation, and it is also possible to set such that the accuracy of the GPS position is high, that is, the dump truck 2 may autonomously travel when a predetermined condition is satisfied even if this is the Float solution, for example.

Although the position and orientation are estimated by the dead-reckoning navigation in both the GPS travel mode and the scan matching navigation travel mode in the above-described embodiment, if a detection period of the detection signal from the GPS receiver and the detection signal from the scan matching navigation position calculation unit is equivalent to that of the dead-reckoning navigation, the dead-reckoning navigation is not necessarily required.

Although the map data creation unit 33C is provided in the dump truck 2 in the above-described embodiment, there is no limitation, and for example, it is possible to provide the map data creation unit 33C on a server and the like provided in the computer 11 in the management device 10 or in another place and transmit the detection result of the laser sensor 24B and required information such as the current position and orientation of the dump truck 2 to the map data creation unit 33C, for example.

Furthermore, although the map storage database (map data) is provided in the dump truck 2, there is no limitation, and for example, it is possible to provide the map data on a server provided in the computer 11 in the management device 10 or in another place, other mining machine 4 or the like and receive the map data prepared in advance from the outside of the own vehicle before calculating the position and orientation of the dump truck 2 by SMN.

Furthermore, although the abnormality is determined by comparing the position derived on the basis of the GPS detector 31 and the position calculated by the SMN position calculation unit 33B in the above-described embodiment, there is no limitation. For example, it is possible to compare the orientation derived by the GPS detector 31 with the orientation calculated by the SMN position calculation unit 33B by the above-described method and to determine that there is the abnormality in either the detection data of the GPS receiver 31 or the calculation result of the SMN position calculation unit 33B if it is determined that the difference (angle or the like) between them is equal to or larger than the threshold.

Furthermore, although the detection data of the GPS detector 31 is diagnosed by comparing the position of the dump truck 2 derived from the detection data of the GPS detector 31 with the position of the dump truck 2 calculated by the scan matching navigation position calculation unit 33B in the above-described embodiment, it is possible to calculate the reliability for each of the detection position of the GPS detector 31 and the position of the dump truck 2 calculated by the scan matching navigation position calculation unit 33B, so that the scan matching navigation position measurement controller 33 may be diagnosed according to the reliability of both.

Meanwhile, although the mining machine used in the mine is described as an example in the above-described embodiment, the present invention is not limited thereto, and may be applied to a work machine used in an underground mine or a work machine used in a work site on the ground. The work machine includes the mining machine.

Although the position of the mining machine is detected using the GNSS detector in the above-described embodiment, there is no limitation, and the position of the mining machine may also be detected on the basis of a well-known "position detection device". Especially, since it is not possible to detect the GNSS in the underground mine, it is possible to use self position estimation and the like of the work machine using, for example, an existing position detection device such as an indoor messaging system (IMES), a pseudolite, a radio frequency identifier (RFID), a beacon, a surveying instrument, a wireless LAN, an ultra wide band (UWB), simultaneous localization and mapping (SLAM), and a landmark (mark provided beside the travel route). These position detection devices may be used for the mining machine in the mine on the ground or the work machine used in the work site on the ground.

Meanwhile, the "object around the work machine" includes not only the object (bank, side wall and the like) present beside the travel route, but also embankments and buildings present around the work machine at the work site on the ground, and obstacles such as trees.

Although the control system of the dump truck in the mine on the ground is described as an example of the "control system of the work machine" in the above-described embodiment, there is no limitation, and the control system of other mining machine in the mine on the ground, the work machine used in the mine under the ground or the work machine used in the work site on the ground (hydraulic excavator, bulldozer, wheel loader and the like), the work machine provided with a "position detection device", a "contactless sensor", and a "position calculation unit" is also included.

REFERENCE SIGNS LIST

1 MANAGEMENT SYSTEM
2 DUMP TRUCK (MINING MACHINE)

2E ENGINE
2G GENERATOR
2S STEERING DEVICE
3 OTHER MINING MACHINE
4 MINING MACHINE
5 POSITIONING SATELLITE
6 RELAY
7 CONTROL FACILITY
9 COMMUNICATION SYSTEM
10 Management device
11 COMPUTER
12 PROCESSING DEVICE
13 STORAGE DEVICE
13B DATABASE
15 INPUT/OUTPUT UNIT
16 DISPLAY DEVICE
17 INPUT DEVICE
18 WIRELESS COMMUNICATION DEVICE
18A ANTENNA
19 GPS BASE STATION
19A ANTENNA
19B TRANSMISSION/RECEPTION DEVICE
19C ANTENNA
20 TRAVEL CONTROLLER (TRAVEL CONTROL UNIT)
21 VEHICLE BODY
22 VESSEL
23 WHEEL
23B BRAKING DEVICE
23F FRONT WHEEL
23M MOTOR
23R REAR WHEEL
24 CONTACTLESS SENSOR
24A RADAR
24B LASER SENSOR
26 GYROSCOPE SENSOR
27 SPEED SENSOR
29 INTERFACE
30 CONTROL SYSTEM
31 GPS RECEIVER (GNSS DETECTOR)
31A ANTENNA
31B ANTENNA
32 TRAVEL ROUTE CREATION DEVICE
32A ROUTE POSITION STORAGE UNIT
33 SCAN MATCHING NAVIGATION POSITION MEASUREMENT CONTROLLER
33A DETERMINATION UNIT
33B SCAN MATCHING NAVIGATION POSITION CALCULATION UNIT (POSITION CALCULATION UNIT)
33C MAP DATA CREATION UNIT
33D STORAGE UNIT
33E DIAGNOSIS UNIT
34 WIRELESS COMMUNICATION DEVICE
34A ANTENNA
35 FIRST COMMUNICATION LINE
36 MAP STORAGE DATABASE
37 SECOND COMMUNICATION LINE
38 OBSERVATION POINT COORDINATE CONVERSION UNIT
39 OBSERVATION POINT AVAILABILITY DETERMINATION UNIT
40 SAFETY CONTROLLER
BK BANK
CR CRUSHER
DPA EARTH DISCHARGING AREA
GR GRID
HL CONVEYANCE PATH
IAH IRRADIATION AREA
IAV IRRADIATION AREA
IS INTERSECTION
KF KALMAN FILTER
LPA LOADING AREA
MI MAP DATA
RP TRAVEL ROUTE

The invention claimed is:

1. A control system of a work machine comprising:
a position detection device which detects a position of a work machine;
a contactless sensor which detects a plurality of actual positions of a plurality of portions of an object around the work machine in a contactless manner;
map data indicating the plurality of actual positions of the plurality of portions of the object, the map data comprising a plurality of grid elements and each of the plurality of portions of the object actually detected by detection data of the contactless sensor indicated as occupying at least a respective one of the grid elements;
a position calculation unit which calculates a position of the work machine by checking at least the map data indicating the plurality of positions of the plurality of portions of the object with the detection data of the contactless sensor, wherein the calculated position of the work machine is calculated by using a plurality of local grid elements of the map data within a local range in which the work machine is expected to be present and using a plurality of likelihoods which are respectively scored for a plurality of positions in which the work machine is expected to be present with respect to the plurality of actual positions of the plurality of portions of the object detected by the detection data of the contactless sensor;
a diagnosis unit which compares the position of the work machine derived from detection data of the position detection device and the position of the work machine calculated by the position calculation unit and diagnoses that there is an abnormality in either the detection data of the position detection device or a calculation result of the position calculation unit; and
a travel control unit configured to allow the work machine to travel in a first travel mode based on an estimated position obtained by performing a position estimation using the detection data of the position detection device and a position estimated by dead-reckoning navigation when there is no diagnosis of abnormality in the detection data of the position detection device, and to switch from allowing the work machine to travel in the first travel mode to allowing the work machine to travel in a second travel mode based on position calculated by the position calculation unit instead of the detection data of the position detection device and the position estimated by the dead-reckoning navigation when there is a diagnosis of abnormality in the detection data of the position detection device.

2. The control system according to claim 1, wherein
the diagnosis unit determines whether a difference between the position of the work machine derived from the detection data of the position detection device and the position of the work machine calculated by the position calculation unit is equal to or larger than a threshold, and
when the diagnosis unit determines that the difference is equal to or larger than the threshold, the diagnosis unit diagnoses that there is an abnormality in either the detection data of the position detection device or the calculation result of the position calculation unit.

3. A control system comprising:
a position detection device which detects a position of a work machine;
a contactless sensor which detects a plurality of actual positions of a plurality of portions of an object around the work machine in a contactless manner;
map data indicating the plurality of actual positions of the plurality of portions of the object, the map data comprising a plurality of grid elements and each of the plurality of portions of the object actually detected by detection data of the contactless sensor indicated as occupying at least a respective one of the grid elements;
a position calculation unit which calculates a position of the work machine by checking at least the map data indicating the plurality of positions of the plurality of portions of the object with the detection data of the contactless sensor, wherein the calculated position of the work machine is calculated by using a plurality of local grid elements of the map data within a local range in which the work machine is expected to be present and using a plurality of likelihoods which are respectively scored for a plurality of positions in which the work machine is expected to be present with respect to the plurality of actual positions of the plurality of portions of the object detected by the detection data of the contactless sensor;
a diagnosis unit which compares the orientation of the work machine derived from detection data of the position detection device and the orientation of the work machine calculated by the position calculation unit and diagnoses that there is an abnormality in either the detection data of the position detection device or a calculation result of the position calculation unit; and
travel control unit configured to allow the work machine to travel in a first travel mode based on an estimated position obtained by performing a position estimation using the detection data of the position detection device and a position estimated by dead-reckoning navigation when there is no diagnosis of abnormality in the detection data of the position detection device, and to switch from allowing the work machine to travel in the first travel mode to allowing the work machine to travel in a second travel mode based on position calculated by the position calculation unit instead of the detection data of the position detection device and the position estimated by the dead-reckoning navigation when there is a diagnosis of abnormality in the detection data of the position detection device.

4. The control system according to claim 3, wherein
the diagnosis unit determines whether a difference between the orientation of the work machine derived from the detection data of the position detection device and the orientation of the work machine calculated by the position calculation unit is equal to or larger than a threshold, and
when the diagnosis unit determines that the difference is equal to or larger than the threshold, the diagnosis unit diagnoses that there is an abnormality in either the detection data of the position detection device or the calculation result of the position calculation unit.

5. The control system according to claim 3, comprising:
a map data creation unit which creates the map data indicating the position of the object detected by the contactless sensor on the basis of at least the detection data of the position detection device and the detection data of the contactless sensor.

6. The control system according to claim 3, comprising:
a travel control unit which allows the work machine to travel on the basis of set course data without using the detection data of the position detection device when the diagnosis unit diagnoses that there is an abnormality in either the detection data of the position detection device or the calculation result of the position calculation unit.

7. The control system according to claim 6,
wherein the travel control unit allows the work machine to travel on the basis of at least the position of the work machine calculated by the position calculation unit and the course data.

8. The control system according to claim 3,
wherein when the diagnosis unit diagnoses that there is an abnormality in either the detection data of the position detection device or the calculation result of the position calculation unit, a travel control unit allows the work machine to travel on the basis of at least the position of the work machine derived from the detection data of the position detection device and course data.

9. The control system according to claim 6,
wherein when the diagnosis unit determines that a time during which a difference is equal to or larger than a threshold exceeds a specified-time, the travel control unit stops travel of the work machine.

10. A work machine comprising:
the control system according to claim 6.

11. A method of managing a work machine comprising:
detecting a position of a work machine by a position detection device;
detecting a plurality of actual positions of a plurality of portions of an object around the work machine in a contactless manner by a contactless sensor;
calculating a position of the work machine by checking at least map data indicating the plurality of actual positions of the plurality of portions of the object with detection data of the contactless sensor, the map data comprising a plurality of grid elements and each of the plurality of portions of the object actually detected by detection data of the contactless sensor indicated as occupying at least a respective one of the grid elements;
wherein the calculated position of the work machine is calculated by using a plurality of local grid elements of the map data within a local range in which the work machine is expected to be present and using a plurality of likelihoods which are respectively scored for a plurality of positions in which the work machine is expected to be present with respect to the plurality of actual positions of the plurality of portions of the object detected by the detection data of the contactless sensor;
comparing the position of the work machine derived from detection data of the position detection device with the calculated position of the work machine, and diagnosing that there is an abnormality in either the detection data of the position detection device or the calculation result of the position of the work machine; and
operating a travel control unit configured to allow the work machine to travel in a first travel mode based on an estimated position obtained by performing a position estimation using the detection data of the position detection device and a position estimated by dead-reckoning navigation when there is no diagnosis of abnormality in the detection data of the position detection device, and to switch from allowing the work machine to travel in the first travel mode to allowing the work machine to travel in a second travel mode based on position calculated by the position calculation unit instead of the detection data of the position detection device and the position estimated by the dead-reckoning navigation when there is a diagnosis of abnormality in the detection data of the position detection device.

12. The control system according to claim 1, comprising:
a map data creation unit which creates the map data indicating the position of the object detected by the contactless sensor on the basis of at least the detection data of the position detection device and the detection data of the contactless sensor.

13. The control system according to claim 1, comprising:
a travel control unit which allows the work machine to travel on the basis of set course data without using the detection data of the position detection device when the diagnosis unit diagnoses that there is an abnormality in either the detection data of the position detection device or the calculation result of the position calculation unit.

14. The control system according to claim 13,
wherein the travel control unit allows the work machine to travel on the basis of at least the position of the work machine calculated by the position calculation unit and the course data.

15. The control system according to claim 1,
wherein when the diagnosis unit diagnoses that there is an abnormality in either the detection data of the position detection device or the calculation result of the position calculation unit, a travel control unit allows the work machine to travel on the basis of at least the position of the work machine derived from the detection data of the position detection device and the course data.

16. The control system according to claim 13,
wherein when the diagnosis unit determines that a time during which a difference is equal to or larger than a threshold exceeds a specified-time, the travel control unit stops travel of the work machine.

17. The control system according to claim 15,
wherein when the diagnosis unit determines that a time during which a difference is equal to or larger than a threshold exceeds a specified-time, the travel control unit stops travel of the work machine.

18. A work machine comprising:
the control system according to claim 1.

19. A management system of a work machine comprising:
a management device which outputs course data defining the travel route to the work machine according to claim 18.

20. The control system according to claim 8,
wherein when the diagnosis unit determines that a time during which a difference is equal to or larger than a threshold exceeds a specified-time, the travel control unit stops travel of the work machine.

* * * * *